US006309728B1

United States Patent
Usami et al.

(10) Patent No.: US 6,309,728 B1
(45) Date of Patent: Oct. 30, 2001

(54) METHOD FOR PRODUCING OPTICAL INFORMATION-RECORDING MEDIUM AND OPTICAL INFORMATION-RECORDING MEDIUM

(75) Inventors: Yoshihisa Usami, Odawara; Tomoyoshi Itaya, Hamura, both of (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/482,097

(22) Filed: Jan. 13, 2000

(30) Foreign Application Priority Data

Jan. 27, 1999 (JP) .................................................. 11-018287
Jun. 21, 1999 (JP) .................................................. 11-174757

(51) Int. Cl.[7] ........................................................ B32B 3/02
(52) U.S. Cl. ........................ 428/64.1; 428/64.8; 428/913; 430/270.14; 427/425
(58) Field of Search .................................. 428/64.1, 64.2, 428/64.4, 64.8, 913; 430/270.14, 495.1, 945; 427/162, 425

(56) References Cited

FOREIGN PATENT DOCUMENTS

| 2-300288 | 12/1990 | (JP) | ................................ C09K/15/20 |
| 3-224793 | 10/1991 | (JP) | ................................ B41M/5/26 |
| 4-146189 | 5/1992 | (JP) | ................................ B41M/5/26 |
| 6-150371 | 5/1994 | (JP) | ................................ G11B/7/24 |

*Primary Examiner*—Elizabeth Evans
(74) *Attorney, Agent, or Firm*—Sughrue, Mion, Zinn, Macpeak & Seas, PLLC

(57) ABSTRACT

Disclosed is a method for producing a heat mode type optical information-recording medium having, on a substrate, a dye recording layer capable of recording information by being irradiated with a laser beam, the method comprising the step of applying a dye solution for forming the dye recording layer onto the substrate while rotating the substrate, wherein a period of time, which ranges from a point of time at which application of the dye solution is started to a point of time at which a valve is fully open, is not less than 0.1 second. In order to satisfy this condition, the opening degree of a first speed controller is not less than 5% and not more than 50%. Accordingly, the opening speed of the valve of a valve apparatus is not less than 5% and not more than 50% with respect to the maximum speed.

18 Claims, 27 Drawing Sheets

FIG. 18

S101
- INCREASE NUMBER OF REVOLUTIONS OF SUBSTRATE TO 300 rpm
- MOVE NOZZLE TO POSITION DEVIATED OUTWARDLY FROM POSITION OF 3/4 OF RADIUS FROM CENTER OF SUBSTRATE
- START APPLICATION OF DYE SOLUTION

S102
- MOVE NOZZLE AT PREDETERMINED MOVEMENT SPEED TOWARD INNER CIRCUMFERENTIAL SIDE OF SUBSTRATE

S103
- INCREASE NUMBER OF REVOLUTIONS OF SUBSTRATE IMMEDIATELY BEFORE NOZZLE ARRIVES AT INNERMOST CIRCUMFERENCE

S104
- STOP ARM FOR 0.2 SECOND AT STATE AT WHICH NOZZLE ARRIVES AT INNERMOST CIRCUMFERENCE

S105
- MOVE NOZZLE AT PREDETERMINED MOVEMENT SPEED TOWARD OUTER CIRCUMFERENTIAL SIDE OF SUBSTRATE

S106
- STOP APPLICATION OF DYE SOLUTION AT STAGE AT WHICH NOZZLE IS SEPARATED FROM INNERMOST CIRCUMFERENCE IN RADIAL DIRECTION BY PREDETERMINED DISTANCE

S107
- INCREASE NUMBER OF REVOLUTIONS OF SUBSTRATE TO 630 rpm IN 6 SECONDS

S108
- INCREASE NUMBER OF REVOLUTIONS OF SUBSTRATE TO 1400 rpm IN 6.3 SECONDS

S109
- INCREASE NUMBER OF REVOLUTIONS OF SUBSTRATE TO 2200 rpm IN 1.7 SECOND, FOLLOWED BY MAINTENANCE OF 2200 rpm FOR 5 SECONDS

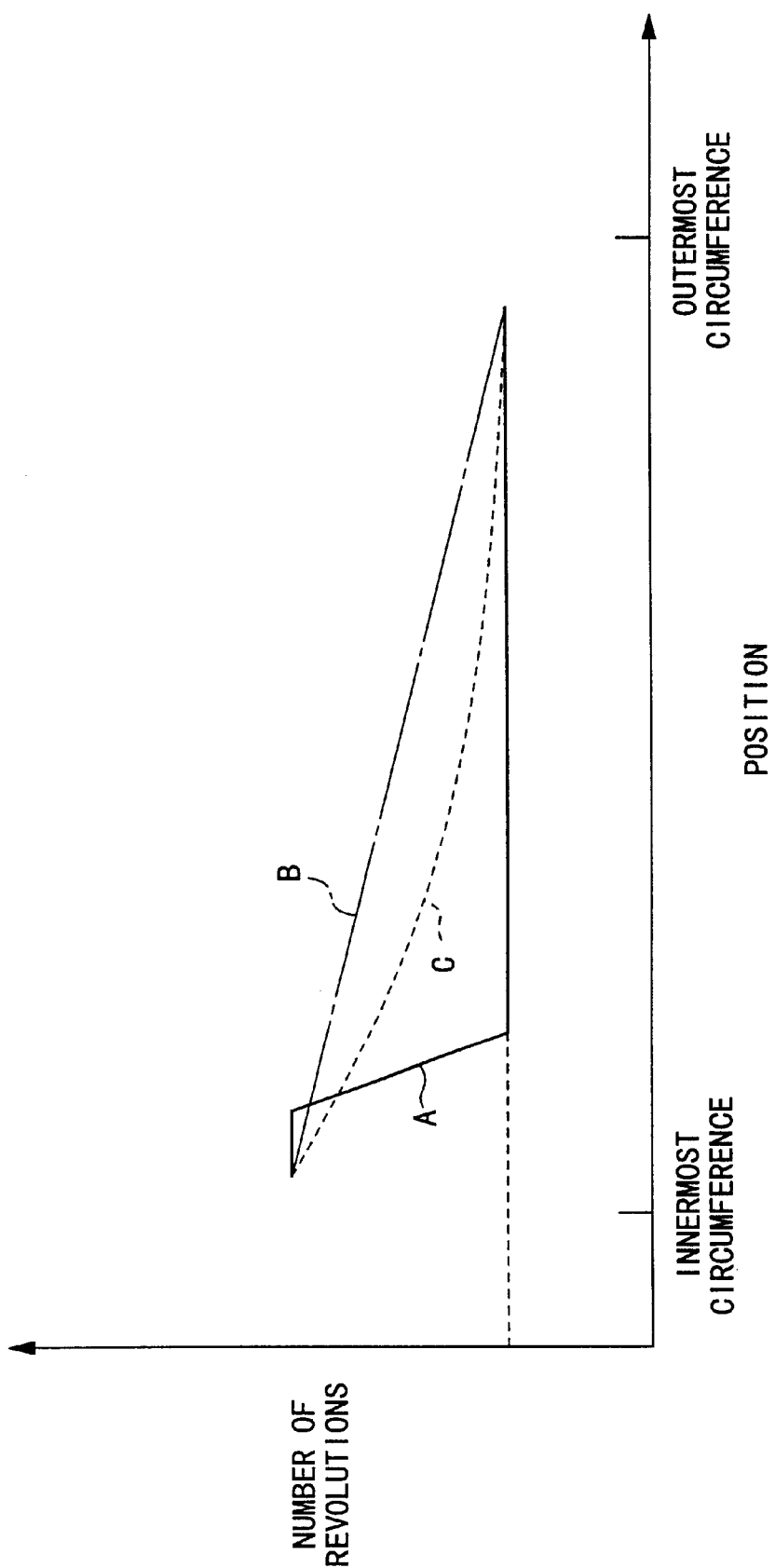

FIG. 23

| | EXAMPLE 1 | EXAMPLE 2 | EXAMPLE 3 | EXAMPLE 4 | COMPARATIVE EXAMPLE 1 | COMPARATIVE EXAMPLE 2 | COMPARATIVE EXAMPLE 3 |
|---|---|---|---|---|---|---|---|
| OPENING DEGREE (%) | 5 | 10 | 20 | 50 | 2 | 60 | 80 |
| SCATTERING PROBABILITY (%) | 0 | 0 | 0 | 0 | 0 | 30 | 60 |
| TIME UNTIL STABILIZATION (sec) | 0.7 | 0.4 | 0.3 | 0.15 | 1.1 | 0.1 | 0.05 |
| APPLICATION RATIO (%) | 50 | 80 | 100 | 100 | 20 | 100 | 100 |

FIG. 24

| | EXAMPLE 5 | EXAMPLE 6 | EXAMPLE 7 | COMPARATIVE EXAMPLE 4 | COMPARATIVE EXAMPLE 5 |
|---|---|---|---|---|---|
| AIR SPEED (m/sec) | 0.1 | 0.2 | 0.4 | 0.6 | 0.1 |
| APPLICATION PATTERN | A | A | A | A | B |
| RADIUS 23mm | 0.12 | 0.11 | 0.10 | 0.09 | 0.15 |
| RADIUS 45mm | 0.12 | 0.11 | 0.10 | 0.08 | 0.13 |
| RADIUS 58mm | 0.12 | 0.10 | 0.09 | 0.07 | 0.12 |
| LIGHT REFLECTANCE (%) | 68 | 69 | 70 | 71 | 66 |

FIG. 25

| | APPLICATION PATTERN | APPLICATION STATE |
|---|---|---|
| EXAMPLE 11 | C | GOOD |
| COMPARATIVE EXAMPLE 11 | D | NON-APPLIED PORTION APPEARED ON OUTER CIRCUMFERENCE |
| COMPARATIVE EXAMPLE 12 | E | DYE SOLUTION BEHAVED LIKE BALLS AND NON-APPLIED PORTION APPEARED |
| COMPARATIVE EXAMPLE 13 | F | DYE SOLUTION BEHAVED LIKE BALLS AND NON-APPLIED PORTION APPEARED |
| COMPARATIVE EXAMPLE 14 | G | SHAPE OF APPLIED PORTION WAS DISTURBED ON INNERMOST CIRCUMFERENCE |
| COMPARATIVE EXAMPLE 15 | H | SHAPE OF APPLIED PORTION WAS DISTURBED ON INNERMOST CIRCUMFERENCE |
| COMPARATIVE EXAMPLE 16 | I | LARGE AMOUNT WAS REQUIRED FOR APPLICATION AND COST WAS EXPENSIVE |

METHOD FOR PRODUCING OPTICAL INFORMATION-RECORDING MEDIUM AND OPTICAL INFORMATION-RECORDING MEDIUM

BACKGROUND OF THE INVENTION

1. Field of the Invention

The present invention relates to a method for producing a heat mode type optical information-recording medium capable of recording and reproducing information by using a laser beam and the optical information-recording medium.

2. Description of the Related Art

In general, the optical information-recording medium (optical disk) capable of recording information only once by using the laser beam includes, for example, write-once type CD (so-called CD-R) and DVD-R. Such an optical information-recording medium is advantageous in that a small amount of CD's can be commercially supplied to the market quickly at a convenient price as compared with the production of conventional CD (compact disk). The demand for such an optical information-recording medium is increasing in accordance with the recent popularization of personal computers or the like.

The optical information-recording medium of the CD-R type has a representative structure comprising a recording layer composed of an organic dye, a light-reflective layer composed of a metal such as gold, and a protective layer made of a resin which are stacked in this order on a transparent disk-shaped substrate having a thickness of about 1.2 mm (see, for example, Japanese Laid-Open Patent Publication No. 6-150371).

The optical information-recording medium of the DVD-R type has a structure comprising two disk-shaped substrates (having a thickness of about 0.6 mm) which are laminated with each other with respective information-recording surfaces disposed inwardly in an opposing manner. The optical information-recording medium of this type has such a feature that a large amount of information is recorded thereon.

Information is written (recorded) on the optical information-recording medium by radiating a near infrared laser beam (laser beam usually having a wavelength of about 780 nm in the case of CD-R or a wavelength of about 635 nm in the case of DVD-R). A portion of the dye recording layer, which is irradiated with the laser beam, absorbs the light, and its temperature is locally raised. As a result, a physical or chemical change (for example, generation of pit) takes place, and the optical characteristic is changed. Thus, the information is recorded.

On the other hand, information is also read (reproduced) by radiating a laser beam usually having the same wavelength as that of the recording laser beam. The information is reproduced by detecting the difference in reflectance between a portion (recorded portion based on the generation of pit) which has subjected to the change in optical characteristic of the dye recording layer and a portion (non-recorded portion) which is not subjected to the change.

For example, a lot number, a manufacturer, and a disk type indication, which indicate the manufacturing history of an optical disk, are printed on a transparent portion disposed on the inner circumferential side of the substrate in some cases. Although such printing forms do not affect the recording operation on the optical disk itself, the quality of their appearance is considered to be important.

As shown in FIG. 27, when a recording layer based on an organic dye is formed on a substrate 1000 of an information-recording medium as described above, a dye solution 1002 is applied onto the substrate 1000 via a nozzle 1004 while rotating the substrate 1000. Therefore, the dye solution 1002, which falls onto the substrate 1000, is occasionally scattered in all directions. It is feared that any defective appearance is brought about at a transparent portion 1006 disposed on the inner circumferential side.

In view of the above, as shown by a two-dot chain line in FIG. 27, a method is conceived, in which a mask 1008 is installed on a portion to which it is not intended to allow any droplet to adhere. However, every time when the application process is carried out, the surface of the mask 1008 is stained by the droplets of the dye solution 1002. When the stain is dried, it is scattered as dust. For this reason, it is feared that a new problem arises in that such a process may cause any defect.

In the case of the heat mode type optical information-recording medium as described above, the tracking servo for the laser beam is performed on the basis of the push-pull signal.

The push-pull signal is dealt with such that the signal intensity obtained when the groove is deviated by 0.1 $\mu$m is normalized with the signal intensity of the reflectance, for example, in the case of CD-R. This procedure is performed as follows. That is, the amplitude of the push-pull signal, which is obtained when the tracking is deviated, is measured to obtain the value by means of calculation.

The push-pull signal, which is used for the tracking servo, is approximately at the zero level when the scanning is regularly performed along one groove by using the laser beam. When the laser beam is deviated from one groove toward the outer circumferential side or the inner circumferential side, the push-pull signal is at a level corresponding to an amount of the deviation. Whether the laser beam is deviated toward the outer circumferential side or the inner circumferential side can be known from the polarity of the signal.

Therefore, when the change in level of the push-pull signal is monitored, then it is possible to perform the tracking servo for one groove by using the laser beam, and it is possible to make access to a desired track address as well.

The conventional optical information-recording medium is manufactured as follows. That is, when the recording layer based on the organic dye is formed on the substrate, the dye solution is applied onto the substrate while rotating the substrate. Especially, the dye solution is applied while rotating the substrate at a constant number of revolutions irrelevant to whether the application is performed for the outer circumferential side or the inner circumferential side of the substrate.

For this reason, the film thickness of the applied dye becomes thick on the inner circumferential side of the substrate. Therefore, for example, the signal intensity of the push-pull signal for the tracking servo is decreased in some cases, and the dispersion is increased as well for the level of the push-pull signal concerning the radial direction of the substrate. In such a case, the tracking deviation of the laser beam occurs highly possibly.

The film thickness, the push-pull, and the reflectance not necessarily behave in a constant manner. However, in general, the following trade-off relationship holds. That is, when the push-pull is increased due to the change in film thickness, the reflectance is decreased.

On the other hand, the increase in signal intensity of the push-pull signal is based on the excessive decrease in reflectance. In this case, an inconvenience arises in that the reading error tends to occur due to the excessive decrease in amplitude of the reproduced signal.

The cost of the dye solution occupies about 30% of the cost of the material for the optical disk. Therefore, in order to reduce the production cost of the optical disk, it is necessary to decrease the amount of application of the dye solution onto the substrate as less as possible.

If the amount of application of the dye solution is decreased, the following problems arise. That is, the shape of the inner circumferential applied portion is disturbed, the distribution of the film thickness of the dye (in the circumferential direction) is deteriorated, and the non-applied portion appears.

The following techniques are available in order to decrease the amount of application of the dye solution. However, each of the techniques involves any problem.

(1) The discharge pressure is lowered. This technique involves the following problem. That is, even if the dye solution is applied to the substrate, then the dye solution flows in a so-called ball form, it rolls on the substrate, and it falls from the substrate. As a result, it is impossible to apply the dye solution uniformly onto the entire surface of the substrate. In this case, problems arise in that the non-applied portion appears, and the film thickness is not uniform.

(2) The application is performed in a shortened period of time. This technique involves the following problem. That is, the dye solution is not distributed over the entire substrate, and problems arise in that the non-applied portion appears, and the film thickness is not uniform.

(3) The nozzle is stopped for a shortened period of time at the inner circumference of the substrate. This technique involves the following problem. That is, the shape of the applied portion at the innermost circumference is disturbed, and it does not form a perfect circle. Also in this case, the film thickness is not uniform.

(4) The nozzle is moved at a fast speed. This technique involves the following problem. That is, even if the dye solution is applied to the substrate, then the dye solution flows in a so-called ball form, it rolls on the substrate, and it falls from the substrate. As a result, it is impossible to apply the dye solution uniformly over the entire surface of the substrate. In this case, problems arise in that the non-applied portion appears, and the film thickness is not uniform.

SUMMARY OF THE INVENTION

The present invention has been made taking the foregoing problems into consideration, an object of which is to provide a method for producing an optical information-recording medium, in which the occurrence of defective appearance is avoided by preventing scattering of a dye solution, and it is possible to improve the yield of the optical information-recording medium.

The present invention has been made taking the foregoing problems into consideration, another object of which is to provide a method for producing an optical information-recording medium, in which the dispersion of the level of a push-pull signal in the radial direction can be decreased, the signal intensity of the push-pull signal can be within a prescribed range, and it is possible to produce the optical information-recording medium having a high quality.

Still another object of the present invention is to provide a method for producing an optical information-recording medium, in which it is possible to obtain an excellent shape of an innermost applied portion even when a small amount of solution is used, it is possible to form a uniform applied dye film over the entire surface of a substrate, and it is possible to produce the optical information-recording medium having a high quality.

Still another object of the present invention is to provide an optical information-recording medium having a high quality, in which an excellent shape is formed at an innermost applied portion even when a small amount of solution is used, and a uniform applied dye film is formed over the entire surface of a substrate.

The present invention lies in a method for producing a heat mode type optical information-recording medium having, on a substrate, a recording layer capable of recording information by being irradiated with a laser beam, the method comprising the step of applying a solution for forming the recording layer onto the substrate while rotating the substrate, wherein a period of time, which ranges from a point of time at which application of the solution is started to a point of time at which an application speed of the solution is constant, is preferably not less than 0.1 second and not more than 1 second. In the present invention, the point of time of start of application of the solution refers to the point of time at which the solution begins to be discharged from the forward end of the nozzle.

Usually, the discharge amount of the solution is transitionally changed in accordance with the passage of time from the point of time of start of application of the solution, and it is finally settled (stabilized) to a constant discharge amount. That is, the "period of time, which starts from a point of time of start of application of the solution and which ends when an application speed is constant", refers to the period of time which ranges from the start of application of the solution until the discharge amount of the solution is settled (stabilized) to be constant.

When the period of time is not less than 0.1 second and not more than 1 second, then the solution is prevented from scattering in all directions at the point of time at which the solution falls on the substrate, and the occurrence of any defective appearance can be avoided. This results in the improvement in yield of the optical information-recording medium.

When the production method described above is carried out by using a valve apparatus for executing and stopping discharge of the solution to the substrate depending on opening and closing of a valve, the method can be achieved such that an opening speed of the valve is not less than 5% and not more than 50% with respect to a maximum speed. In other words, the opening speed of the valve of the valve apparatus for discharging the solution is preferably made slow.

When a speed controller for controlling a flow rate of a fluid to be supplied to the valve apparatus is used to open and close the valve by means of a fluid pressure, an opening degree of the speed controller for determining the flow rate of the fluid is preferably not less than 5% and not more than 50%.

The solution may be a dye-containing organic solvent. A position to start the application is preferably on the substrate. It is preferable that the position to start the application is separated by not less than 5 mm from a non-applied portion located on an inner circumferential side of the substrate. In other words, it is preferable that the position to start the application is at a portion which is deviated toward the outer circumference by not less than 5 mm from the end on the inner circumferential side of the region which is intended to be formed as a recording layer.

When the position to start the application is sufficiently separated from the non-applied portion located on the inner circumferential side of the substrate, no problem occurs even if the solution is scattered, because of the following reason. That is, scattered droplets flow away during the application process performed thereafter.

Immediately after the application is started, the discharge amount of the solution is transitionally changed in accordance with the passage of time, and it is not stable. Therefore, it is preferable that the application is started at the position which is slightly separated from the innermost circumference. If the application is started from the innermost circumference, any uneven application is caused. As a result, it is feared that the inner circumferential end of the recording layer is not formed to be a fine circle.

Once the application is started, the nozzle is moved toward the inner circumferential side at least once thereafter. By doing so, the inner circumferential end of the recording layer is formed to be a fine circle.

However, if the application is started at a position which is located outside the substrate, the solution is scattered in various directions when it abuts against the outer circumferential end of the substrate. As a result, for example, problems arise in that the neighborhood of the applied portion is stained, and the solution adheres to the back surface of the substrate.

Therefore, the application start position is preferably located on the substrate, and more preferably located at the position which is deviated toward the inner circumference by not less than 5 mm from the outer circumferential end of the substrate. Further, the application start position is deviated toward the outer circumference by not less than 5 mm, preferably not less than 10 mm, and more preferably not less than 15 mm from the non-applied portion located on the inner circumferential side of the substrate.

It is preferable that a pressure exerted on the solution is not more than 1 $kgf/cm^2$. In general, when the solution is applied to the substrate, the solution is scattered in all directions if the discharge of the solution is suddenly started. However, when the pressure exerted on the solution is small, the solution is not scattered so much. Therefore, any problem such as appearance defect does not occur.

However, if the pressure is too low, then the discharge amount per unit time is decreased, and the application speed is slow. Therefore, it takes a long period of time to apply a prescribed amount of the solution. As a result, it is feared that the throughput is decreased, and the production efficiency is lowered.

Therefore, as described above, the upper limit of the preferred range of the pressure exerted on the solution is not more than 1 $kgf/cm^2$, preferably not more than 0.8 $kgf/cm^2$, and most preferably not more than 0.6 $kgf/cm^2$. The lower limit is not less than 0.02 $kgf/cm^2$, preferably not less than 0.05 $kgf/cm^2$, and most preferably not less than 0.1 $kgf/cm^2$.

In the method described above, it is also preferable that when a nozzle for applying the solution onto the substrate is moved toward an innermost circumference of the substrate, a number of revolutions of the substrate is increased.

Accordingly, the shape of the applied portion at the innermost circumference can be made excellent even when a small amount of the solution is used. Further, it is possible to form a uniform applied film over the entire surface of the substrate. Thus, it is possible to produce the optical information-recording medium having a high quality.

In this method, it is preferable that the application of the solution is started from an outer circumference of the substrate. Specifically, the application of the solution is started from a portion located outwardly from a position of ¾ of a radius from a center of the substrate, preferably from a portion located outwardly from a position of ⅚, and most preferably from a portion located outwardly from a position of 9/10, because of the following reason. That is, if the solution is applied only to inner circumferential portions, the solution is not distributed over the entire surface of the substrate. As a result, it is feared that the film thickness distribution is deteriorated at the outer circumference.

When the solution is applied to the outer circumference of the substrate, the number of revolutions of the substrate is not more than 300 rpm, preferably not more than 250 rpm, and most preferably not more than 200 rpm, because of the following reason. That is, if the number of revolutions is large when the solution is applied to the outer circumference, then the solution behaves like balls, and it tends to roll and fall. As a result, the application of the solution to the substrate is incomplete.

In the method described above, the solution is applied by using the nozzle at a pressure of not more than 1.0 atm., preferably not more than 0.7 atm., and most preferably not more than 0.5 atm., because of the following reason. That is, if the pressure is high, then the flow rate of the solution is increased, the amount of use of the solution is increased, and the production cost is consequently expensive. When the diameter of the nozzle is increased twice, the pressure preferably has a value which is ¼ of the numerical value described above. When the diameter of the nozzle is ½, the pressure preferably has a value which is four times the numerical value described above.

In the method described above, the solution is applied by using the nozzle at a flow rate of not more than 0.5 cc/second, preferably not more than 0.3 cc/second, and most preferably not more than 0.2 cc/second, because of the following reason. That is, if the solution is applied at a large flow rate, then the amount of use of the dye solution is increased, and the production cost is consequently expensive.

In the method described above, when the solution is applied to the innermost circumference of the substrate, the number of revolutions of the substrate is not less than 300 rpm, preferably not less than 350 rpm, and most preferably not less than 400 rpm, because of the following reason. That is, if the number of revolutions is small, then the shape of the applied portion at the innermost circumference is not substantially a perfect circle, and the film thickness of the recording layer is not uniform. The nozzle must be stopped for a period of time corresponding to one revolution at the minimum over the innermost circumference. On this condition, if the number of revolutions is small, the period of time, in which the nozzle is stopped, is prolonged. As a result, a problem arises in that the discharge amount of the solution is increased. Therefore, the number of revolutions is preferably set to be within the range of the number of revolutions described above.

In the method described above, the number of revolutions of the substrate, which is used when the solution is applied to the innermost circumference of the substrate, is made to be larger by not less than 50 revolutions than the number of revolutions of the substrate which is used when the solution is applied to an outer circumference of the substrate. The former is made to be larger than the latter preferably by not less than 100 revolutions and most preferably by not less than 200 revolutions.

In this method, the timing, at which the number of revolutions of the substrate is increased, is set immediately before the nozzle arrives at the innermost circumference. Specifically, the number of revolutions of the substrate is increased at a stage at which the nozzle arrives at a position which is separated from the innermost circumference of the substrate by a distance shorter than 20 mm, preferably at a stage at which the nozzle arrives at a position which is separated from the innermost circumference of the substrate by a distance shorter than 10 mm, and most preferably at a stage at which the nozzle arrives at a position which is separated from the innermost circumference of the substrate by a distance shorter than 5 mm.

In the method described above, it is preferable that an air-conditioning air speed with respect to an application surface of the substrate is set to be not more than about 0.4 m/sec.

It is also preferable to combine the procedure in which the number of revolutions of the substrate is increased when the nozzle for applying the solution onto the substrate is moved from the innermost circumference toward the outermost circumference of the substrate, and the procedure in which the number of revolutions of the substrate is increased when the nozzle for applying the solution onto the substrate is moved toward the innermost circumference of the substrate.

In another aspect, the present invention lies in a heat mode type optical information-recording medium comprising, on a substrate, a recording layer capable of recording information by being irradiated with a laser beam, wherein the recording layer is formed by applying a solution for forming the recording layer onto the substrate while rotating the substrate, and the recording layer is formed by applying the solution such that a number of revolutions of the substrate is increased when the solution is applied to an inner circumferential side of the substrate.

Accordingly, it is possible to obtain the optical information-recording medium having a high quality, in which the shape of the innermost circumference is excellent even when a small amount of the solution is used, and a uniform applied dye film is formed over the entire surface of the substrate.

The above and other objects, features, and advantages of the present invention will become more apparent from the following description when taken in conjunction with the accompanying drawings In which a preferred embodiment of the present invention is shown by way of illustrative example.

BRIEF DESCRIPTION OF THE DRAWINGS

FIG. 18 shows a block diagram illustrating steps of a second process procedure carried out when the dye solution is applied to the substrate by using the production system according to the embodiment of the present invention;

FIG. 19 illustrates the timing for increasing the number of revolutions of the substrate in the second process;

FIG. 23 shows a table illustrating results of a first illustrative experiment;

FIG. 24 shows a table illustrating results of a second illustrative experiment;

FIG. 25 shows a table illustrating results of a third illustrative experiment;

DESCRIPTION OF THE PREFERRED EMBODIMENTS

Explanation will be made below with reference to FIGS. 1 to 27 for illustrative embodiments in which the method for producing the optical information-recording medium, the method for applying the dye for the dye-based optical disk, and the optical information-recording medium according to the present invention are applied, for example, to a system for producing an optical disk such as CD-R (hereinafter simply referred to as "production system according to the embodiment").

Figure 1:
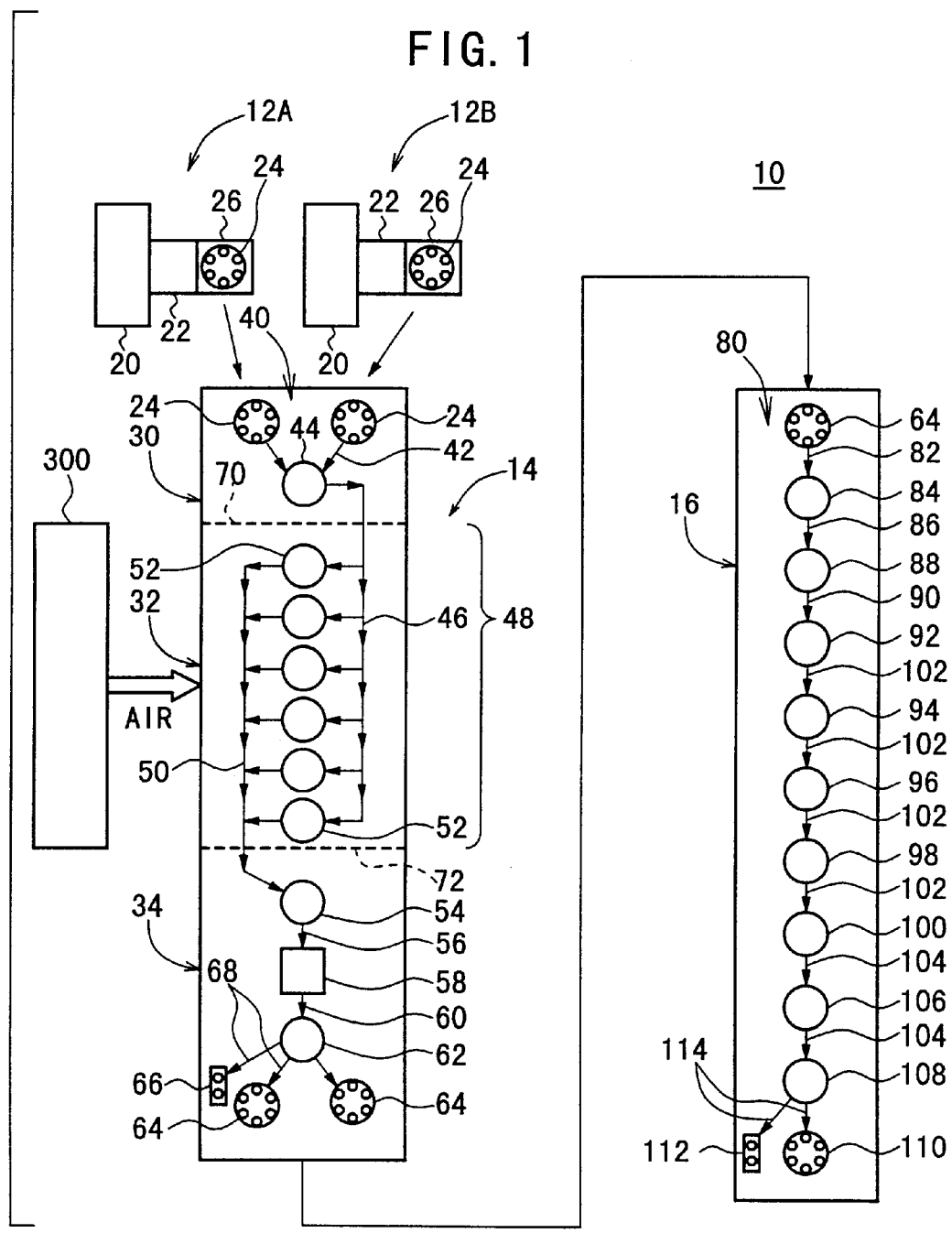
FIG. 1 shows an arrangement of an exemplary production system according to an embodiment of the present invention.

As shown in FIG. 1, a production system 10 according to the embodiment of the present invention comprises two molding equipments (first and second molding equipments 12A, 12B) for producing substrates by means of, for example, injection molding, compression molding, or injection compression molding, an application equipment 14 for forming a dye recording layer on the substrate by applying a dye application solution onto a first principal surface of the substrate followed by drying, and an aftertreatment equipment 16 for forming a light-reflective layer on the dye recording layer of the substrate by means of, for example, sputtering, and then applying a UV-curable solution onto the light-reflective layer, followed by Uw irradiation to form a protective layer on the light-reflective layer.

Each of the first and second molding equipments 12A, 12B includes a molding machine 20 for performing injection molding, compression molding, or injection compression molding of a resin material such as polycarbonate to produce the substrate formed, on the first principal surface, with a tracking groove or irregularity (groove) to indicate information such as an address signal, a cooling section 22 for cooling the substrate taken out of the molding machine 20, and a stacking section 26 (stack pole rotary table) installed with a plurality of stack poles 24 for stacking and storing the substrates after being cooled.

The application equipment 14 comprises three process units 30, 32, 34. The first process unit 30 includes a stack pole-accommodating section 40 for accommodating the stack pole 24 transported from the first and second molding equipments 12A, 12B, a first transport mechanism 42 for extracting the substrate one by one from the stack pole 24 accommodated in the stack pole-accommodating section 40 to transport the substrate to the next step, and an electrostatic blow mechanism 44 for removing static electricity from one substrate transported by the first transport mechanism 42.

The second process unit 32 includes a second transport mechanism 46 for successively transporting, to the next step, the substrate completed for the electrostatic blow treatment in the first process unit 30, a dye application mechanism 48 for applying a dye application solution to a plurality of substrates transported by the second transport mechanism 46 respectively, and a third transport mechanism 50 for transporting the substrate completed for the dye application treatment one by one to the next step. The dye application mechanism 48 comprises six spin coat apparatuses 52.

The third process unit 34 comprises a back surface-washing mechanism 54 for washing the back surface of one substrate transported by the third transport mechanism 50, a fourth transport mechanism 56 for transporting, to the next step, the substrate completed for the back surface washing, a numbering mechanism 58 for stamping a lot number or the like on the substrate transported by the fourth transport mechanism 56, a fifth transport mechanism 60 for transporting, to the next step, the substrate completed for the stamping of the lot number or the like, an inspecting mechanism 62 for inspecting the presence or absence of defect and the film thickness of the dye recording layer of the substrate transported by the fifth transport mechanism 60, and a sorting mechanism 68 for sorting the substrates into those to be stacked on a stack pole 64 for normal products and those to be stacked on a stack pole 66 for NG depending on a result of inspection performed by the inspecting mechanism 62.

A first partition plate 70 is installed between the first process unit 30 and the second process unit 32. A second partition plate 72 is installed as well between the second process unit 32 and the third process unit 34 in the same manner as described above. An opening (not shown), which has a size of such a degree that the transport passage for the substrate transported by the second transport mechanism 46 is not closed, is formed at a lower portion of the first partition plate 70. An opening (not shown), which has a size of such a degree that the transport passage for the substrate transported by the third transport mechanism 50 is not closed, is formed at a lower portion of the second partition plate 72.

The aftertreatment equipment 16 includes a stack pole-accommodating section 80 for accommodating the stack pole 64 for normal products transported from the application equipment 14, a sixth transport mechanism 82 for extracting the substrate one by one from the stack pole 64 accommodated in the stack pole-accommodating section 80 and transporting the substrate to the next step, a first electrostatic blow mechanism 84 for removing static electricity from one substrate transported by the sixth transport mechanism 82, a seventh transport mechanism 86 for successively transporting the substrate completed for the electrostatic blow treatment to the next step, a sputtering mechanism 88 for forming, by means of sputtering, a light-reflective layer on the first principal surface of the substrate transported by the seventh transport mechanism 86, an eighth transport mechanism 90 for successively transporting the substrate completed for the sputtering of the light-reflective layer to the next step, and an edge-washing mechanism 92 for washing the circumferential edge (edge portion) of the substrate transported by the eighth transport mechanism 90.

The aftertreatment equipment 16 further includes a second electrostatic blow mechanism 94 for removing static electricity from the substrate completed for the edge washing, a UV-curable solution-applying mechanism 96 for applying a UV-curable solution to the first principal surface of the substrate completed for the electrostatic blow treatment, a spin mechanism 98 for rotating, at a high speed, the substrate completed for the application of the UV-curable solution to obtain a uniform thickness of the applied film the UV-curable solution on the substrate, a UV-radiating mechanism 100 for radiating ultraviolet light onto the substrate completed for the application of the UV-curable solution and the spin treatment so that the UV-curable solution is cured to form a protective layer on the first principal surface of the substrate, a ninth transport mechanism 102 for transporting the substrate to the second electrostatic blow mechanism 94, the UV-curable solution-applying mechanism 96, the spin mechanism 98, and the UV-radiating mechanism 100 respectively, a tenth transport mechanism 104 for transporting the substrate irradiated with UV to the next step, a defect-inspecting mechanism 106 for inspecting the defect of the applied surface and the protective layer surface of the substrate transported by the tenth transport mechanism 104, a characteristic-inspecting mechanism 108 for inspecting the signal characteristic based on the groove formed on the substrate, and a sorting mechanism 114 for sorting the substrates into those to be stacked on a stack pole 110 for normal products and those to be stacked on a stack pole 112 for NG depending on a result of inspection performed by the defect-inspecting mechanism 106 and the characteristic-inspecting mechanism 108.

The arrangement of one of the spin coat apparatuses 52 will now be explained with reference to FIGS. 2 to 8.

Figure 2:
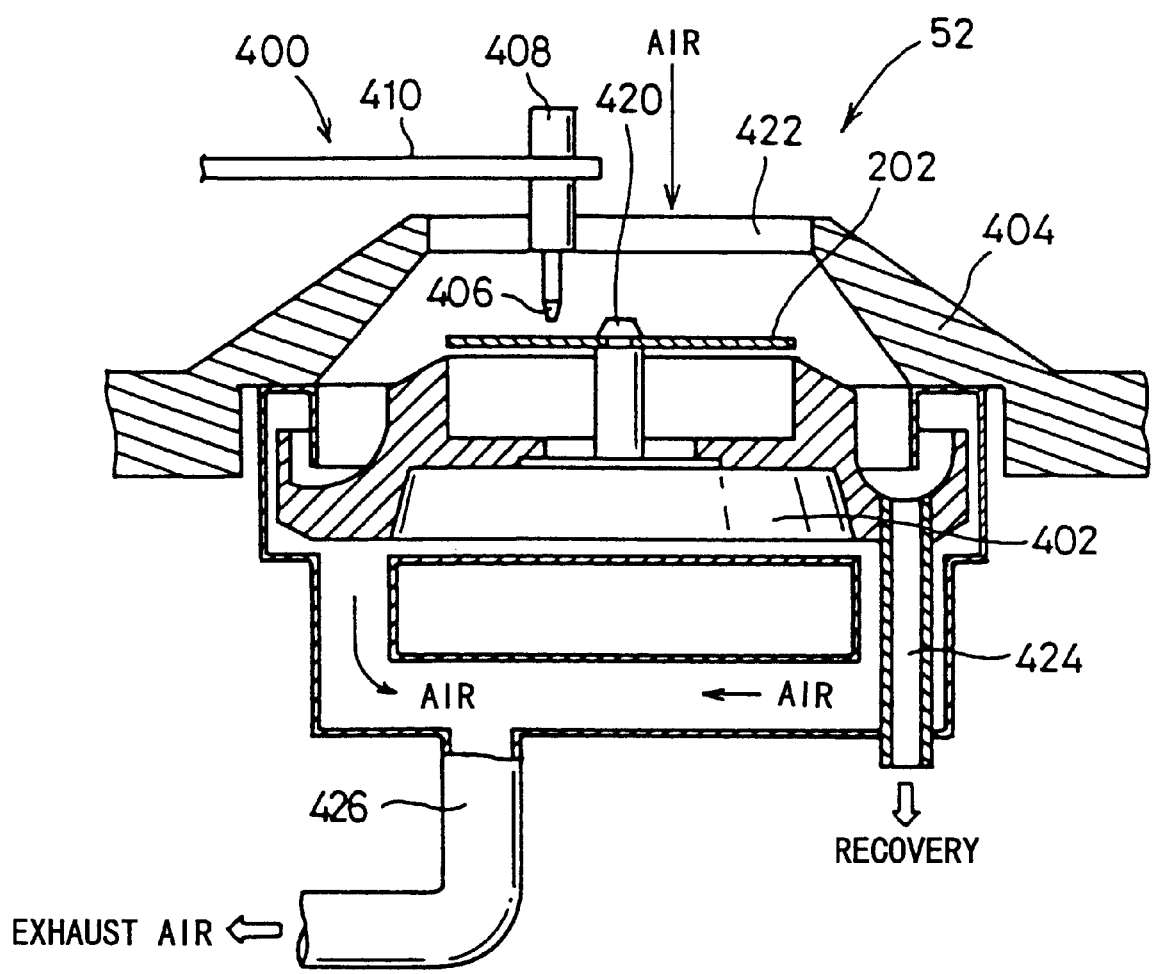
FIG. 2 shows an arrangement of a spin coat apparatus installed in an application equipment.
Figure 3:
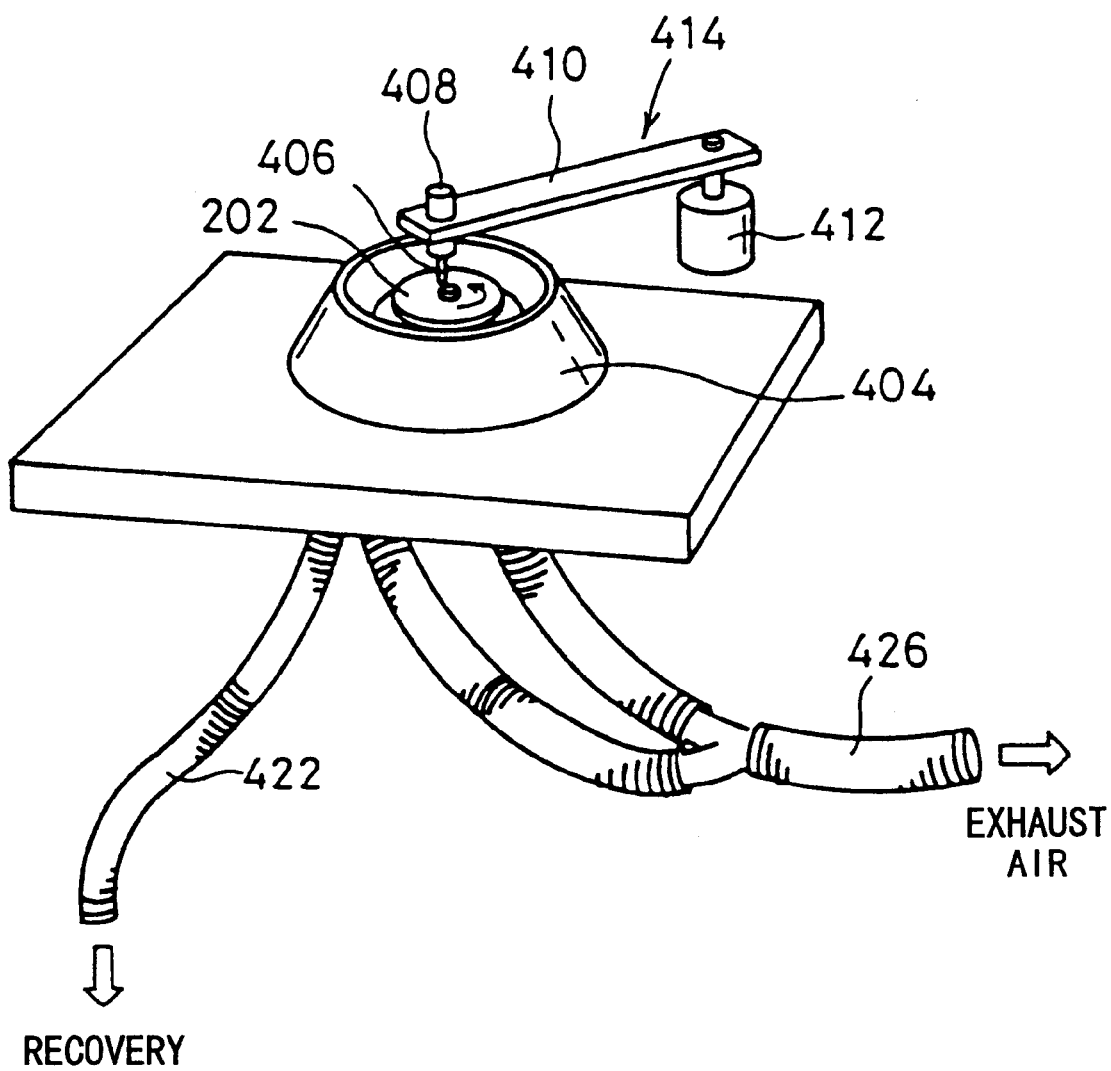
FIG. 3 shows a perspective view illustrating the spin coat apparatus installed In the application equipment.

As shown in FIGS. 2 and 3, the spin coat apparatus 52 comprises a solution supply apparatus 400, a spinner head apparatus 402, and a scattering-preventive wall 404.

Figure 4:
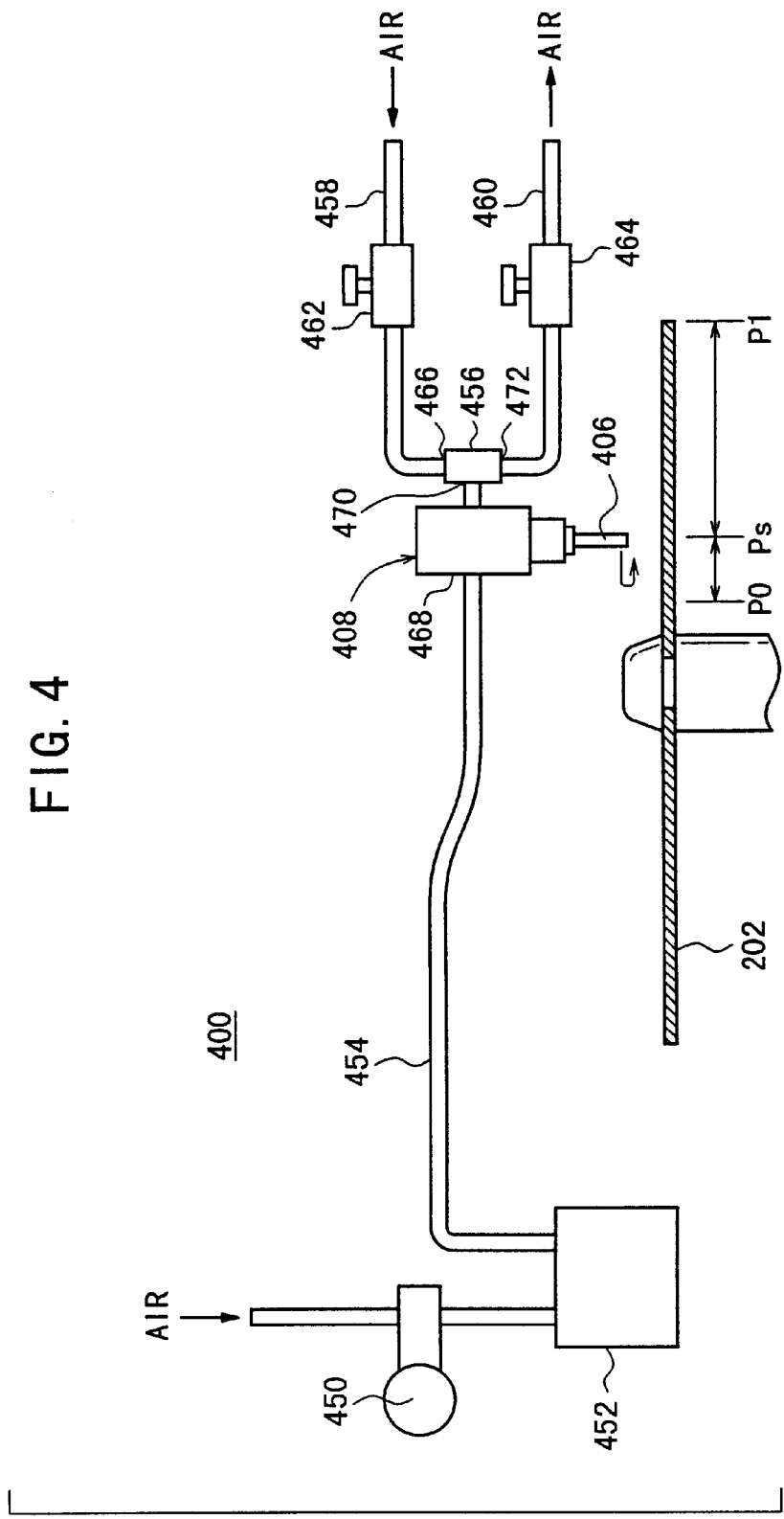
FIG. 4 shows an arrangement of a solution supply apparatus for constructing the spin coat apparatus.

As shown in FIG. 4, the solution supply apparatus 400 includes a pressurizing tank 452 containing the dye solution charged therein and having a pressure to be exerted on the dye solution regulated by a regulator 450, a valve apparatus 408 for controlling discharge and stop of the dye solution with respect to the substrate 202 in accordance with opening and closing of a valve, and a conduit 454 arranged to extend from the pressurizing tank 452 to the valve apparatus 408 for supplying the dye solution charged in the pressurizing tank 452 to the valve apparatus 408. A predetermined amount of the dye solution is dripped onto the surface of the substrate 202 through a nozzle 406 of the valve apparatus 408. The pressure, which is exerted on the dye solution in the pressurizing tank 452, is set to be not more than 1 kgf/cm$^2$.

As shown in FIGS. 2 and 3, the solution supply apparatus 400 is arranged to be capable of making swinging movement from a waiting position to a position over the substrate 202 by the aid of a handling mechanism 414 comprising a support plate 410 for supporting the nozzle 406 directed downwardly and a motor 412 for swinging the support plate 410 in the horizontal direction.

As shown in FIG. 4, the valve apparatus 408 is provided with a quick exhaust valve 456 so that the internal valve is opened and closed by means of the fluid pressure. Speed controllers (first and second speed controllers 462, 464) for adjusting the flow rate of the fluid are connected to a fluid supply line 458 and a fluid exhaust line 460 respectively.

The quick exhaust valve 456 has an input port 466 to which the fluid supply line 458 is connected, an output port to which a main valve apparatus body 468 is connected, and an exhaust port 472 which is connected to the fluid exhaust line 460.

The fluid, which is introduced from the fluid supply line 458, is supplied to the main valve apparatus body 468 via the input port 466 and the output port 470 of the quick exhaust valve 456. The internal valve is operated in the opening direction in accordance with the increase in pressure in the main valve apparatus body 468 corresponding to the supply of the fluid. Therefore, the opening speed of the valve (change of opening degree of the valve per unit time) is proportional to the amount of supply of the fluid per unit time. The supply amount is adjustable depending on the opening degree of the first speed controller 462.

Figure 5:
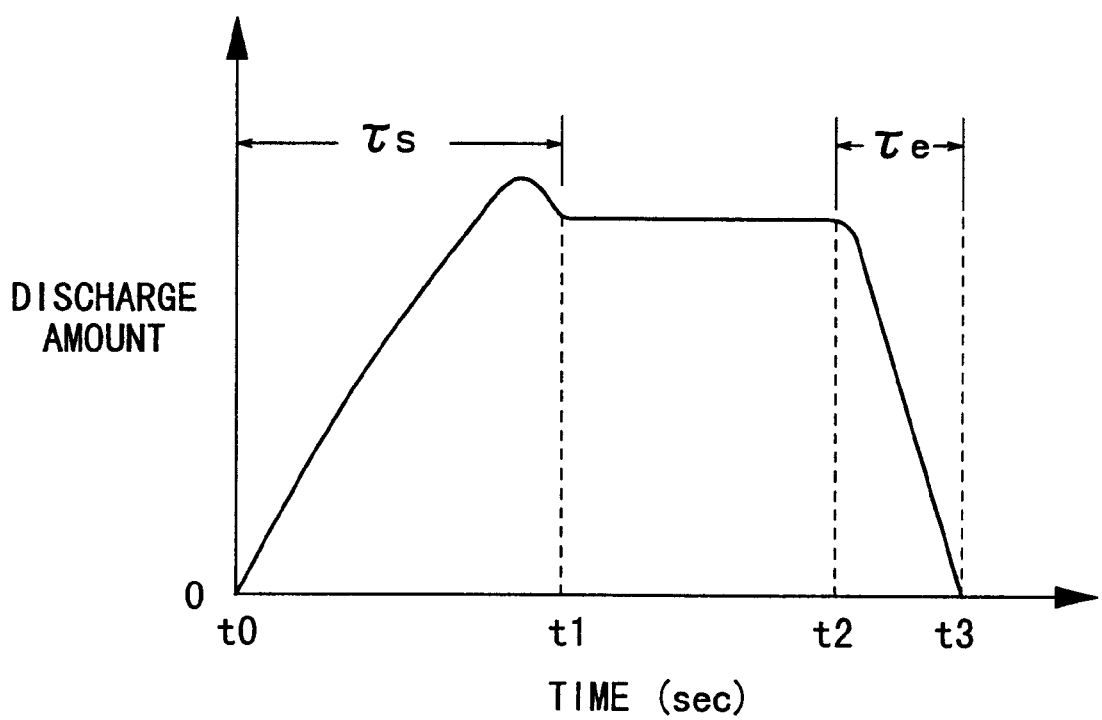
FIG. 5 shows a characteristic curve illustrating the change of the amount (discharge amount) of a dye solution discharged from a valve apparatus in accordance with the passage of time.

When the valve is operated in the opening direction, then the dye solution, which is supplied from the pressurizing tank 452, is discharged through the-nozzle 406 of the valve apparatus 408, and thus the dye solution is applied onto the substrate 202. During this process, as shown in FIG. 5, the discharge amount is increased substantially proportionally in accordance with the passage of time corresponding to the increase in opening degree of the valve. The discharge amount becomes constant at a stage at which a certain period of time has elapsed, i.e., at a stage at which the valve is fully open.

In other words, the application speed is increased approximately proportionally at the transitional stage in which the valve is progressively opened. The application speed is constant at the stage at which the valve is fully open.

The span of change (slope of characteristic curve) of the discharge amount depends on the opening speed of the valve at the transitional stage in which the discharge amount is increased proportionally. The span of change of the discharge amount is decreased as the opening speed is decreased. In other words, the smaller the opening degree of the first speed controller 462 is, the smaller the span of change (slope of characteristic curve) of the discharge amount is, and the longer the time τs from the point of time to at which the application of the dye solution is started to the point of time t1 at which the valve is fully open (point of time at which the application speed of the dye solution is constant) is. On the contrary, the larger the opening degree of the first speed controller 462 is, the larger the span of change of the discharge amount is, and the shorter the time τs from the point of time t0 at which the application of the dye solution is started to the point of time t1 at which the valve is fully open is. In this embodiment, the phrase "point of time t0 at which the application of the dye solution is started" refers to the point of time at which the dye solution begins to be discharged from the forward end of the nozzle 406.

In the embodiment of the present invention, the time τs, which ranges from the point of time t0 at which the application of the dye solution is started to the point of time t1 at which the valve is fully open, is not less than 0.1 second and not more than 1 second. In order to satisfy this condition, the embodiment of the present invention is designed such that the opening degree of the first speed controller 462 is not less than 5% and not more than 50%. Thus, the opening speed of the valve is not less than 5% and not more than 50% with respect to the maximum speed.

Accordingly, the dye solution is prevented from scattering in all directions at the point of time at which the dye solution falls onto the substrate 202. Thus, it is possible to avoid the occurrence of any defective appearance.

On the other hand, the fluid in the main valve apparatus body 468 is introduced into the fluid exhaust line 460 via the output port 470 and the exhaust port 472. The internal valve is operated in the closing direction in accordance with the decrease in pressure in the main valve apparatus body 468 corresponding to the exhaust amount of the fluid. Therefore, the closing speed of the valve is proportional to the amount of exhaust of the fluid per unit time. The exhaust amount is adjustable depending on the opening degree of the second speed controller 464.

When the valve is operated in the closing direction, then the discharge of the dye solution through the nozzle 406 is stopped, and the dye application treatment is completed for one substrate 202.

During this process, as shown in FIG. 5, the discharge amount is decreased substantially proportionally in accordance with the passage of time corresponding to the decrease in opening degree of the valve. At a stage at which the valve is fully closed, the discharge amount of the dye solution is zero, i.e., the discharge of the dye solution is stopped.

Also in this case, the span of change (slope of characteristic curve) of the discharge amount depends on the closing speed of the valve at the stage in which the discharge amount is decreased proportionally. The span of change of the discharge amount is decreased as the closing speed is decreased. In other words, the smaller the opening degree of the second speed controller 464 is, the smaller the span of change of the discharge amount is, and the longer the time τs from the point of time t2 at which the application stop of the dye solution is started to the point of time t3 at which the valve is fully closed (point of time at which the discharge amount of the dye solution is zero) is. On the contrary, the larger the opening degree of the second speed controller 464 is, the larger the span of change of the discharge amount is, and the shorter the time τs from the point of time t2 at which the application stop of the dye solution is started to the point of time t3 at which the valve is fully closed.

In the embodiment of the present inventions, the opening degree of the second speed controller 464 is set to be 100% in order that the time le, which ranges from the point of time t2 at which the application stop of the dye solution is started to the point of time t3 at which the valve is fully closed, is made as short as possible.

On the other hand, as shown in FIGS. 2 and 3, the spinner head apparatus 402 is arranged under the solution supply apparatus 400. The substrate 202 is held horizontally by the aid of a detachable fixture 420, and it is rotatable around the axis by the aid of a driving motor (not shown).

The dye solution is dripped from the nozzle 406 of the solution supply apparatus 400 onto the substrate 202 which is rotated in a state of being horizontally held by the spinner head apparatus 402. The dye solution is subjected to casting toward the outer circumferential side on the surface of the substrate 202. An excessive amount of the dye solution is separated off from the outer circumferential edge of the substrate 202, and it is discharged toward the outside. Subsequently, the applied film is dried. Thus, the applied film (dye recording layer 204) is formed on the substrate 202.

The scattering-preventive wall 404 is provided in order that the excessive amount of the dye solution discharged toward the outside from the outer circumferential edge of the substrate 202 is prevented from scattering to the surroundings. The scattering-preventive wall 404 is arranged around the spinner head apparatus 402 so that an opening 422 is formed at an upper portion. The excessive amount of the dye solution, which is gathered by the aid of the scattering-preventive wall 404, is recovered through a drain 424.

The local ventilation is effected as follows for each of the spin coat apparatuses 52 of the second process unit 32 (see FIG. 1). That is, the air, which is introduced through the opening 422 formed at the upper portion of the scattering-preventive wall 404, is allowed to flow against the surface of the substrate 202. Subsequently, the air is exhausted through an exhaust tube 426 which is attached to a lower portion of each of the spinner head apparatuses 402.

Figure 6:
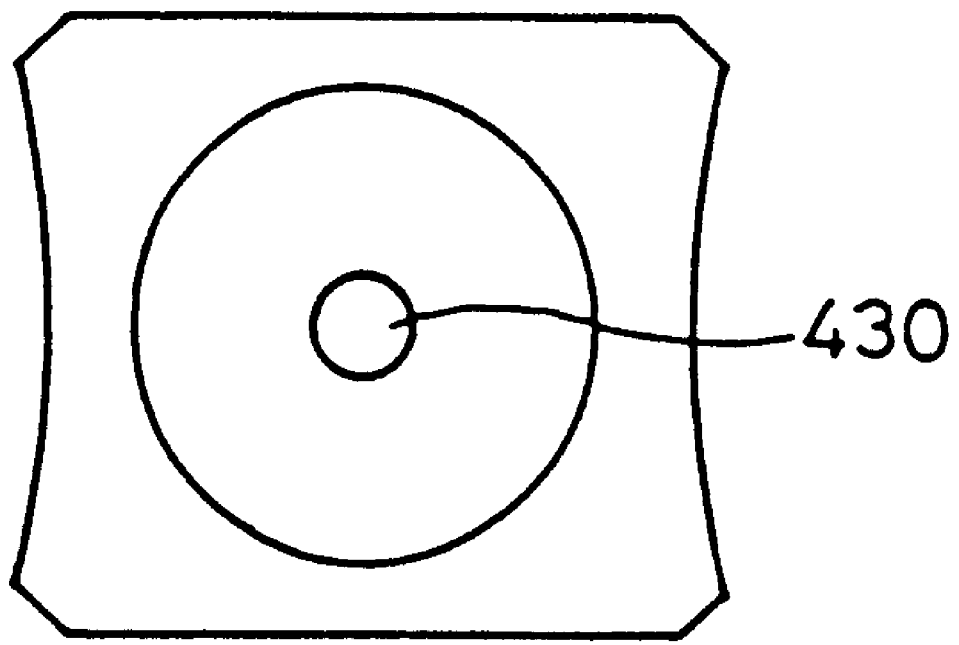
FIG. 6 shows a plan view illustrating a nozzle of the valve apparatus.
Figure 7:
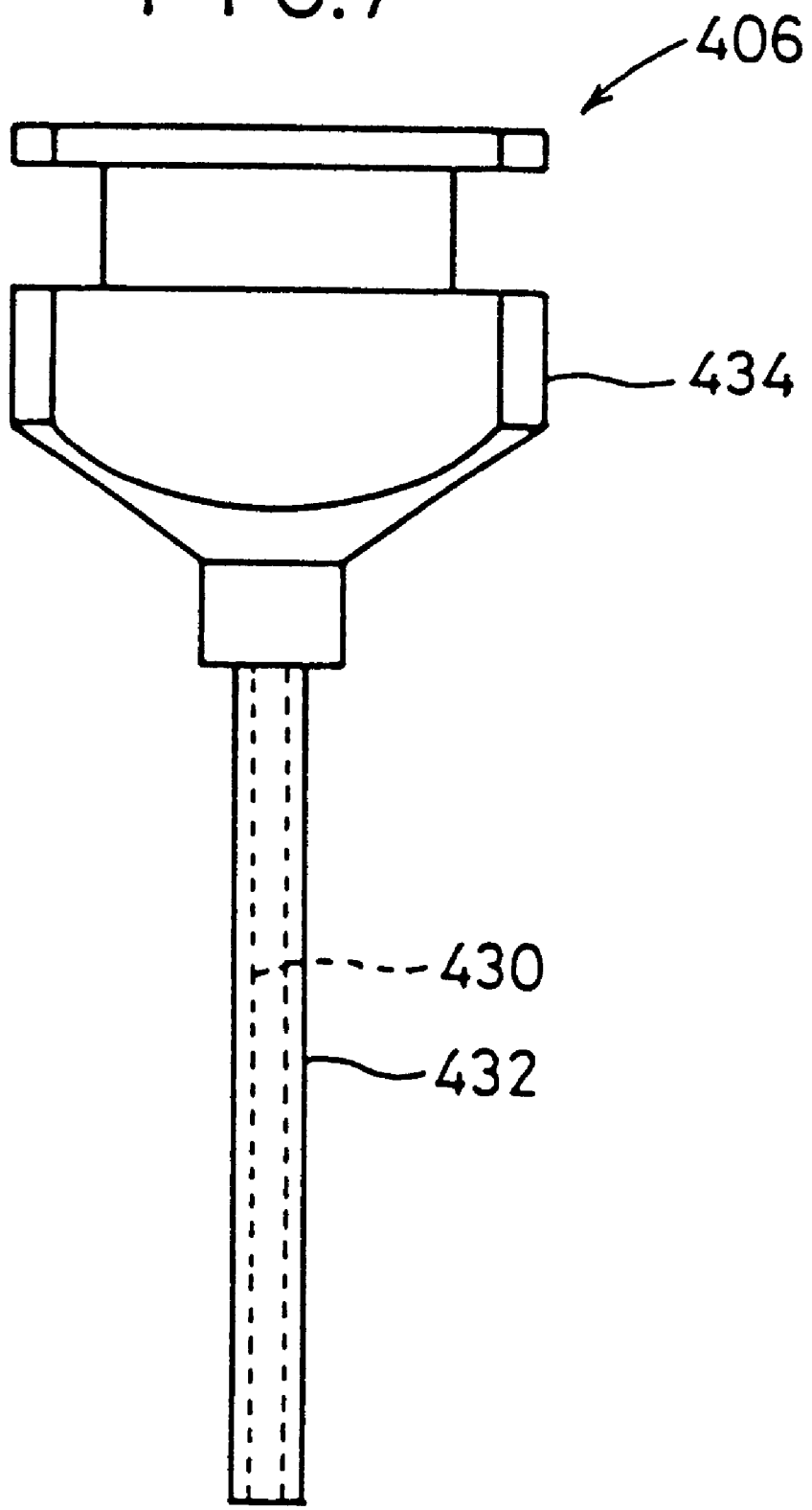
FIG. 7 shows a side view illustrating the exemplary nozzle of the valve apparatus.

As shown in FIGS. 6 and 7, the nozzle 406 of the solution supply apparatus 400 includes a slender cylindrical main nozzle body 432 having a through-hole 430 formed therethrough in the axial direction, and an attachment section 434 for fixing the main nozzle body 432 to the support plate 410 (see FIG. 3). The main nozzle body 432 has the following surface. That is, the forward end surface and the outer or inner wall surface or both of the outer and inner wall surfaces ranging over a distance of not less than 1 mm from the forward end surface are composed of a fluorine compound. Those usable as the fluorine compound include, for example, polytetrafluoroethylene and polytetrafluoroethylene-containing substances.

Figure 8:
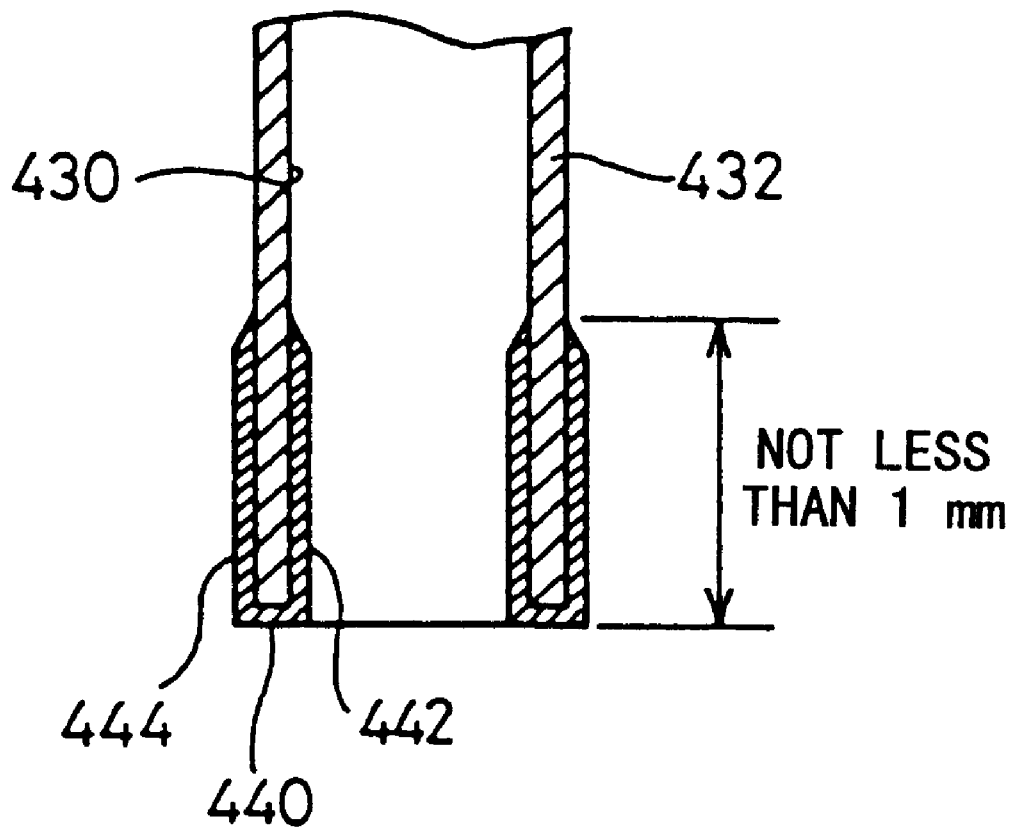
FIG. 8 shows, with partial omission, a magnified sectional view illustrating another exemplary nozzle of the valve apparatus.

Preferred examples of the nozzle 406 to be used in this embodiment include, for example, the nozzle 406 in which the portion, which includes the forward end surface of the main nozzle body 432 and which ranges over a distance of not less than 1 mm from the forward end surface, is formed by using the fluorine compound as shown in FIG. 7, and a nozzle 406 in which the portion, which includes the forward end surface 440 of the main nozzle body 432 and which includes the outer or inner wall surface or both of the outer and inner wall surfaces 442, 444 ranging over a distance of not less than 1 mm from the forward end surface 440, is coated with the fluorine compound as shown in FIG. 8.

When the portion, which includes the forward end surface of the main nozzle body 432 and which ranges over the distance of not less than 1 mm from the forward end surface, is formed of the fluorine compound, the following arrangement is preferable from a practical viewpoint. That is, for example, the main nozzle body 432 is formed of stainless steel. Further, the forward end surface and the portion ranging over a distance of 5 mm at the maximum are formed of the fluorine compound.

When the portion, which includes the forward end surface 440 of the main nozzle body 432 and which includes the outer or inner wall surface or both of the outer and inner wall surfaces 442, 444 ranging over the distance of not less than 1 mm from the forward end surface 440, is formed of the fluorine compound as shown in FIG. 8, it is preferable that an area ranging over a distance of not less than 10 mm from the forward end surface 440 of the main nozzle body 432 is coated with the fluorine compound. It is more preferable that the entire area of the main nozzle body 432 is coated with the fluorine compound. When the area as described above is coated, the thickness is not specifically limited. However, the thickness is appropriately within a range of 5 to 500 $\mu$m. The material for the main nozzle body 432 is preferably stainless steel as described above. The diameter of the through-hole 430 formed through the main nozzle body 432 is generally within a range of 0.5 to 1.0 mm.

Figure 9:
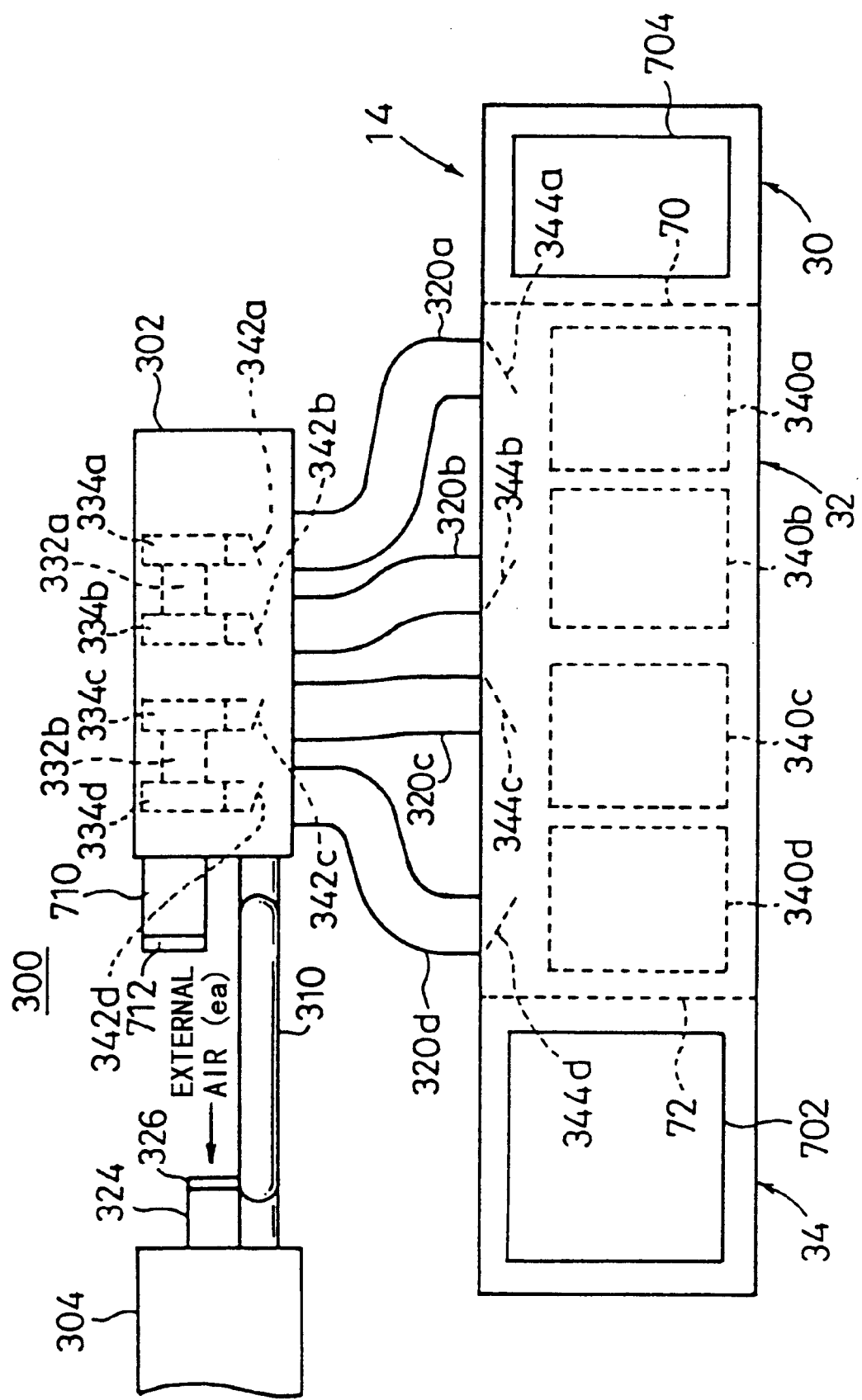
FIG. 9 shows a plan view illustrating an air-conditioning system.
Figure 10:
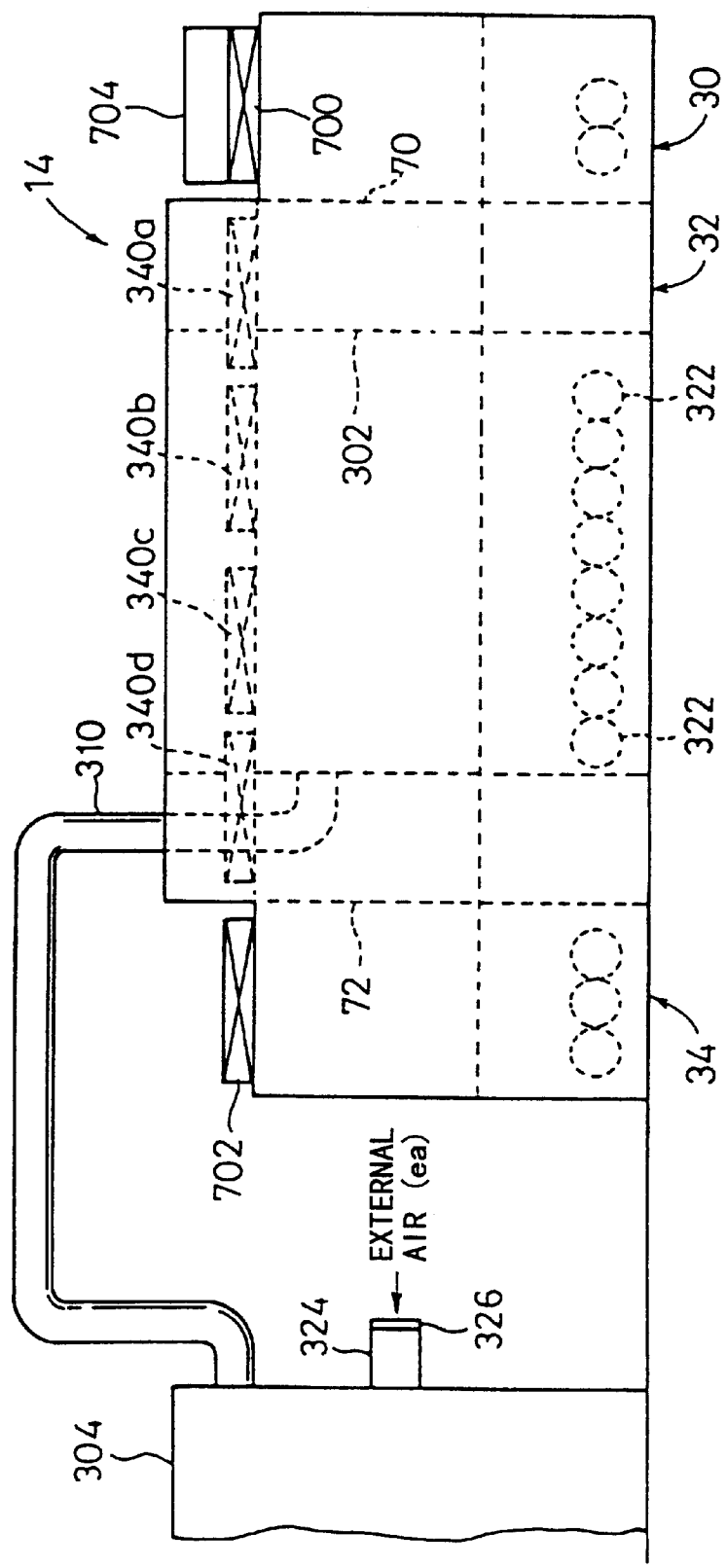
FIG. 10 shows a front view illustrating the air-conditioning conditioning system.
Figure 11:
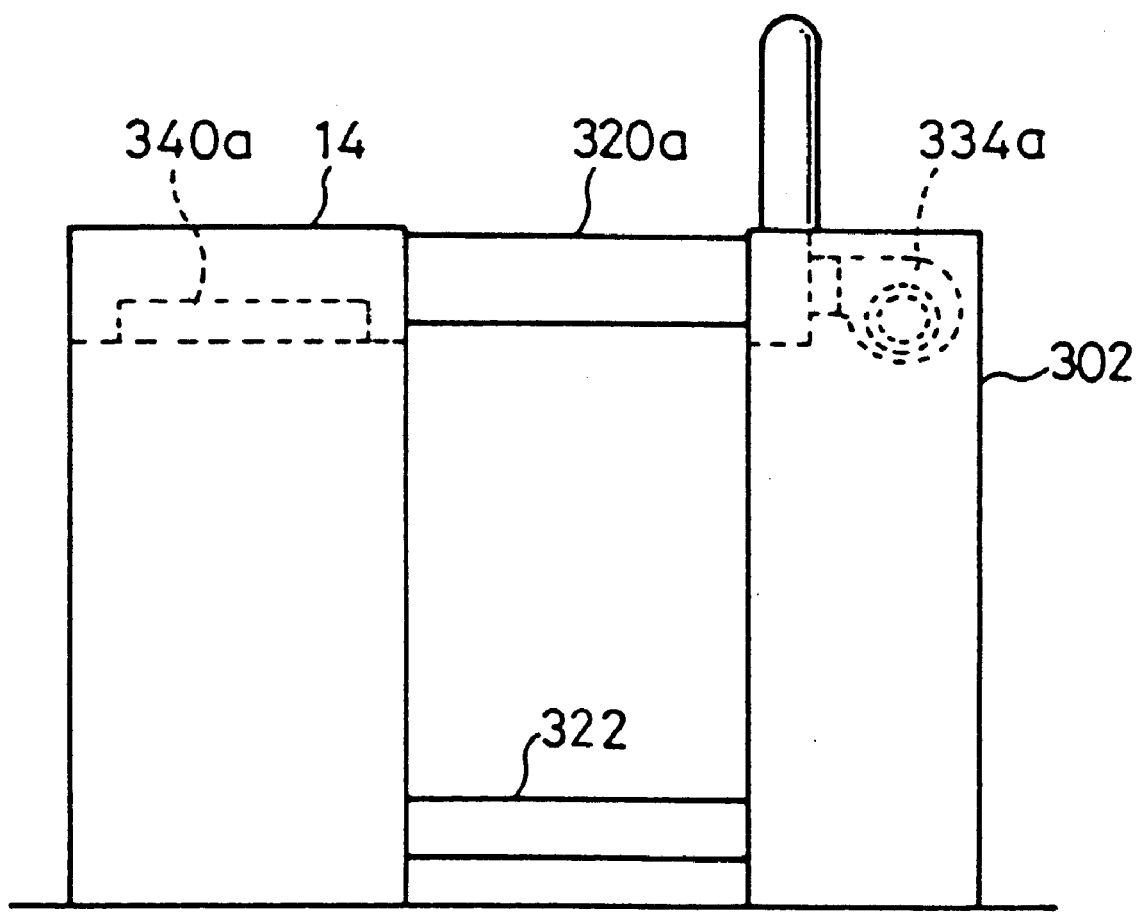
FIG. 11 shows a side view illustrating the air-conditioning system.

As shown in FIG. 1, the production system 10 is further installed with an air-conditioning system 300 in parallel to the second process unit 32 of the application equipment 14. As shown in FIGS. 9 and 10, an air conditioner 704 is installed on the ceiling of the first process unit 30 via a high performance packed bed filter (HEPA filter) 700. A HEPA filter 702 is installed on the ceiling of the third process unit 34.

The air conditioner 704 feeds the clean air to the first process unit 30 so that the temperature in the first process unit 30 may be controlled. The clean air is introduced into the third process unit 34 through the HEPA filter 702.

Figure 14:
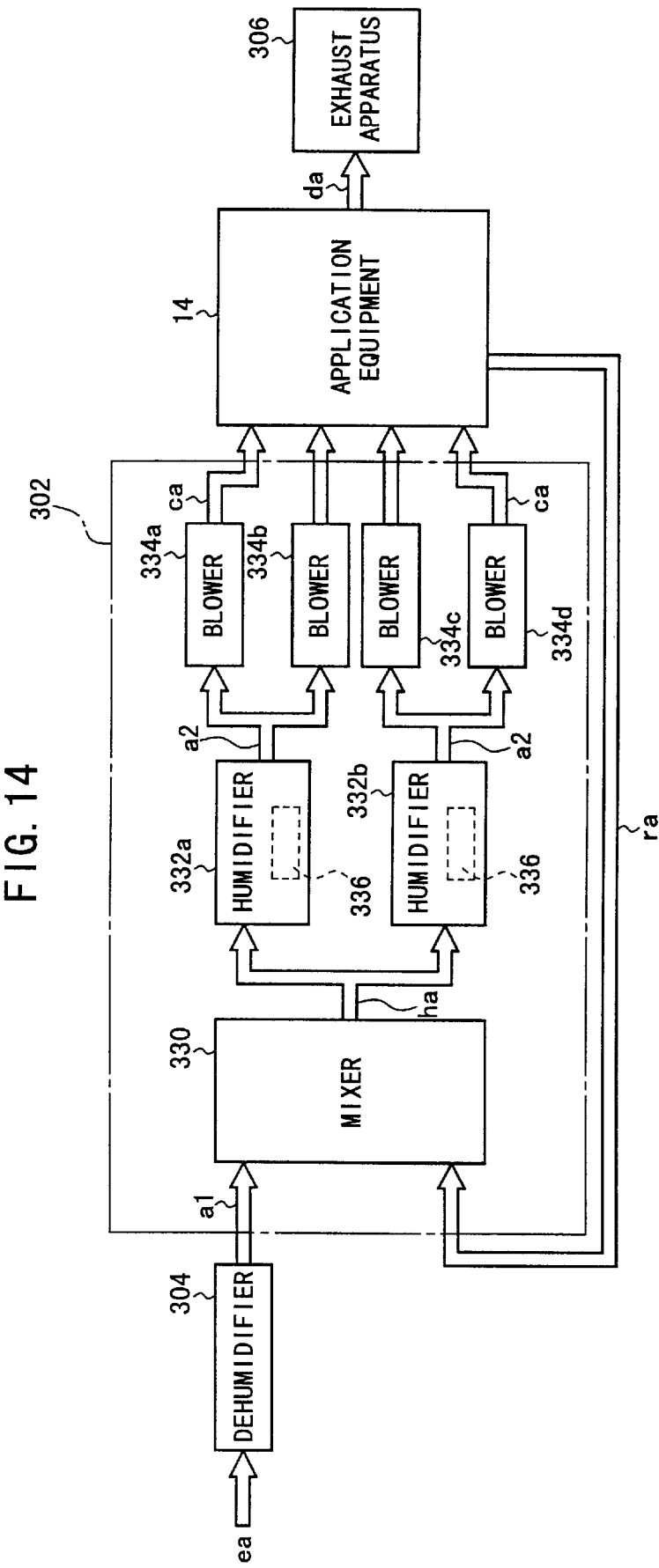
FIG. 14 shows a block diagram illustrating an arrangement of an air conditioner.

On the other hand, as shown in FIGS. 9 and 14, the air-conditioning conditioning system 300 comprises an air conditioner 302 for feeding the clean air "ca" to the application equipment 14, a dehumidifier 304 for introducing the external air "ea" to perform dehumidification so that the air is outputted as primary air a1, and an exhaust apparatus 306 (see FIG. 12) for receiving a part of discharge air (local discharge air) "da" from the application equipment 14 and feeding it to the superordinate exhaust line. The local discharge air "da" includes, for example, the discharge air discharged from the six spin coat apparatuses 52 of the dye application mechanism 48 of the application equipment 14.

Figure 12:
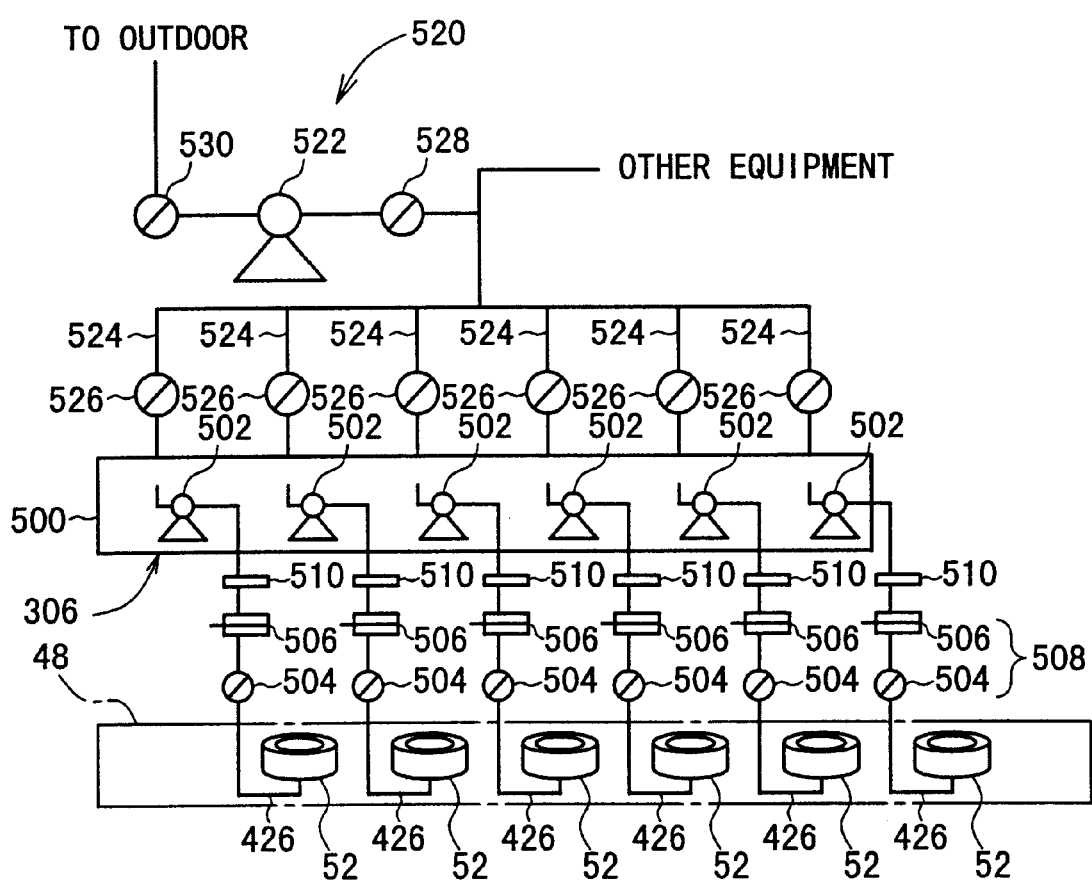
FIG. 12 shows an arrangement of an exhaust apparatus of the air-conditioning system together with a superordinate exhaust line.

On the other hand, as shown in FIGS. 9 and 10, the air-conditioning system 300 is provided with a duct 310 for feeding the primary air al outputted from the dehumidifier 304 to the air conditioner 302, the duct 310 being disposed between the dehumidifier 304 and the air conditioner 302. As shown in FIG. 12, the exhaust tube 426 described above is provided between the exhaust apparatus 306 and each of the exhaust sides of the six spin coat apparatuses 52 of the dye application mechanism 48 of the application equipment 14.

Those installed between the air conditioner 302 and the application equipment 14 are a plurality of (four in the embodiment illustrated in the drawing) air supply ducts 320a to 320d for feeding the clean air "ca" outputted from the air conditioner 302 to the application equipment 14, and a plurality of (eight in the embodiment illustrated in the drawing) return ducts 322 for returning the discharge air "ra" other than the local discharge air "da" from the application equipment 14 to the air conditioner 302.

The air conditioner 302 is installed with an inlet port 710 for introducing the external air "ea". A prefilter 712 is attached to the inlet port 710. In the ordinary air conditioning control (when the low humidity control is not performed), the air, which is introduced from the inlet port 710, is supplied as the primary air to the air conditioner 302.

The dehumidifier 304 is used when the low humidity control is performed. As shown in FIGS. 9 and 10, the dehumidifier 304 is installed with an inlet port 324 for introducing the external air "ea". A prefilter 326 is attached to the inlet port 324. Therefore, the external air "ea" is introduced through the inlet port 324, from which dust, dirt, and the like are removed by the prefilter 326. The external air "ea" is introduced into the inside of the dehumidifier 304 to perform the dehumidifying treatment in the dehumidifier 304. The dehumidified external air is supplied as the primary air to the air conditioner 302 disposed at the downstream stage.

As shown in FIG. 14, the air conditioner 302 comprises a mixer 330 for mixing the primary air al from the dehumidifier 304 or the inlet port 710 and the discharge air (discharge air other than the local discharge air) "ra" from the application equipment 14 to obtain the mixed air "ha" to be outputted, two humidifiers 332a, 332b for performing the humidifying treatment for the mixed air "ha" outputted from the mixer 330 to obtain the secondary air a2 to be outputted, and four blowers 334a to 334d for feeding, to the application equipment 14, the secondary air a2 from the two humidifiers 332a, 332b.

Each of the humidifiers 332a, 332b includes, at its inside, a heating plate 336 for adding vaporized water to the primary air a1. Pure water is spread over the heating plate 336. The pure water used in this embodiment is appropriately pure water having a specific resistance of not less than 0.15 MΩ (room temperature). It is possible to use pure water preferably having a specific resistance of not less than 1.5 MΩ (room temperature), and more preferably having a specific resistance of not less than 15 MΩ (room temperature). In this embodiment, pure water having a specific resistance of 2 MΩ (room temperature) is used.

The method for obtaining the pure water includes, for example, a method based on the use of the distillation and the ion exchange resin. However, it is preferable to use the method based on the use of the ion exchange resin, for example, in view of the efficiency of removal of impurities.

On the other hand, as shown in FIGS. 9 and 10, four high performance packed bed filters (HEPA filters) 340a to 340d are installed at upper portions of the application equipment 14, of the air supply passages to the application equipment 14. Directional control plates 342a to 342d are installed respectively between the four blowers 334a to 334d and the four respective corresponding air supply ducts 320a to 320d. Directional control plates 344a to 344d are installed respectively as well at upper portions of the application equipment 14 between the four air supply ducts 320a to 320d and the respective corresponding HEPA filters 340a to 340d.

The directional control plates 342a to 342d, 344a to 344d are installed in oblique directions so that the clean air "ca", which is fed from the first to fourth blowers 334a to 334d via the first to fourth air supply ducts 320a to 320d respectively, is uniformly distributed and delivered to the six spin coat apparatuses 52 disposed in the second process unit 32.

That is, when the plurality of directional control plates are provided in the air feed passages as described above, then the moisture in the air humidified by the air conditioner 302 can be uniformly mixed (agitated and dispersed), and the dispersion of humidity can be mitigated for the respective spin coat apparatuses 52 of the second process unit 32. Further, it is possible to eliminate any difference in air speed between the respective spin coat apparatuses 52, concerning the air speed in the downward direction in the respective spin coat apparatuses 52.

Further, as shown in FIG. 1, the first partition plate 70 is provided between the first and second process units 30, 32, and the second partition plate 72 is provided between the second and third process units 32, 34. Therefore, there is neither inflow of air from the first process unit 30 to the second process unit 32 nor inflow of air from the third process unit 34 to the second process unit 32. Accordingly, it is possible to maintain a state in which the pressure in the atmosphere in the second process unit 32 is higher than the pressures in the respective atmospheres in the first and third process units 30, 34.

That is, the four directional control plates 342a to 342d disposed on the side of the air conditioner 302, the four directional control plates 344a to 344d disposed on the side of the application equipment 14, and the first and second partition plates 70, 72 function as air feed amount control means for maintaining the state in which the pressure in the atmosphere in the second process unit 32 is higher than the pressures in the respective atmospheres in the first and third process units 30, 34.

Figure 13:
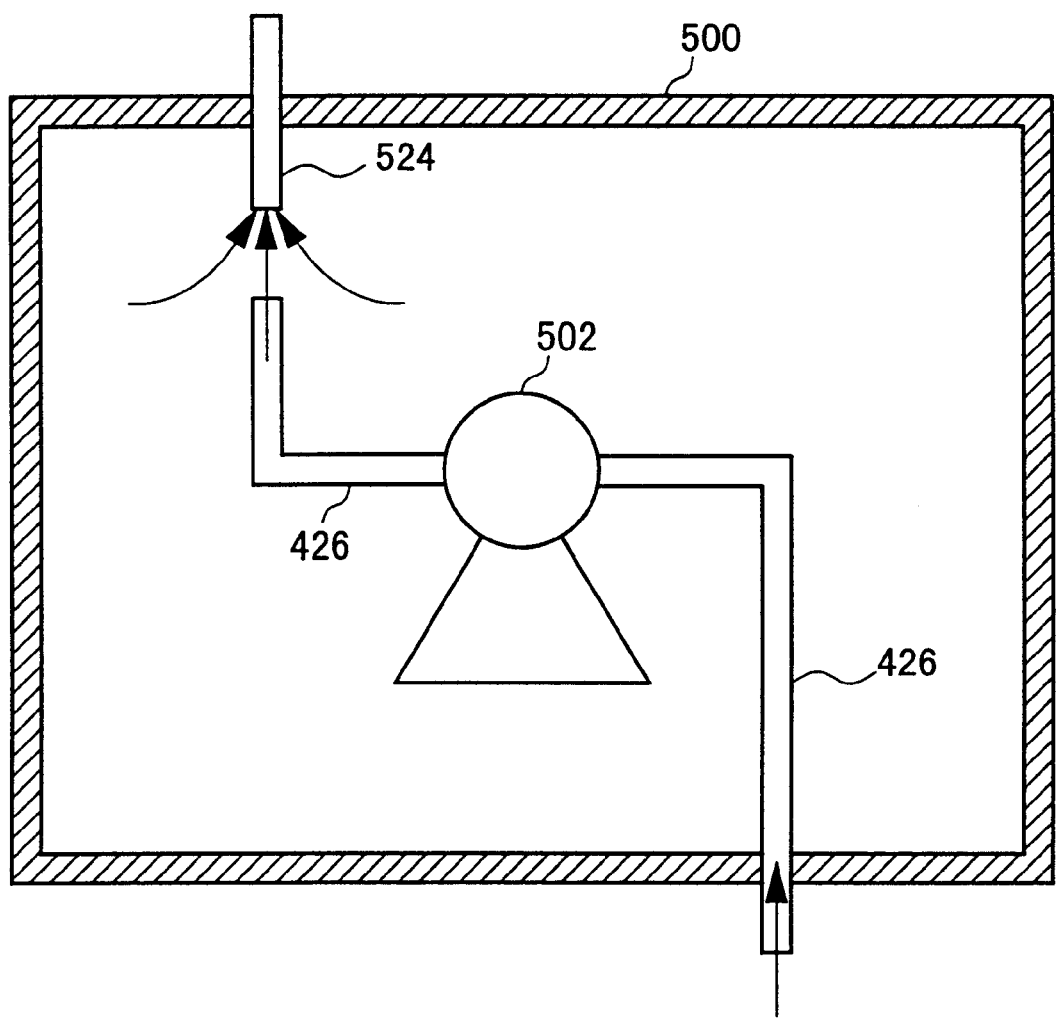
FIG. 13 shows a sectional view illustrating an arrangement of a buffer box installed in the exhaust apparatus.

As shown in FIGS. 12 and 13, the exhaust apparatus 306 is provided with a buffer box 500 which is air-tight at the inside and which has an outer casing formed to have a substantially rectangular parallelepiped-shaped configuration. Six exhaust blowers 502 are provided in the buffer box 500 corresponding to the six spin coat apparatuses 52 of the application equipment 14.

An exhaust amount control valve mechanism 508 comprising, for example, a butterfly valve 504 and a shutter 506, and an exhaust amount sensor 510 for electrically detecting the exhaust amount are installed between each of the six spin coat apparatuses 52 and each of the corresponding exhaust blowers 502. The drying condition for the applied film can be appropriately changed by adjusting the exhaust amount.

A superordinate exhaust line 520 is connected at the downstream stage of the buffer box 500. As shown in FIG. 12, the superordinate exhaust line 520 is arranged such that the air is exhausted for the application equipment 14 and the air is also exhausted for the molding equipment and the aftertreatment equipment as well as for other various production equipments by the aid of an outdoor blower 522 installed at the outdoor.

Six exhaust tubes 524 of a large number of exhaust tubes of the superordinate exhaust line 520, which are allotted for the application equipment, are connected to the buffer box 500 respectively. In this embodiment, as shown in FIG. 13, the six exhaust tubes 524 extending from the superordinate exhaust line 520 to the application equipment 14 are separated from the six exhaust tubes 426 led from the exhaust blowers 502 respectively in the buffer box 500. A butterfly valve 526 is installed for each of the six exhaust tubes 524 extending from the superordinate exhaust line 520 to the application equipment 14, making it possible to adjust the exhaust amount to the superordinate exhaust line 520. Butterfly valves 528, 530 are installed on the upstream side and the downstream side of the outdoor blower 522, making it possible to adjust the exhaust amount to the outdoor.

Next, the process for producing the optical disk by using the production system 10 will be explained with reference to FIGS. 15A to 18 as well.

Figure 15A:
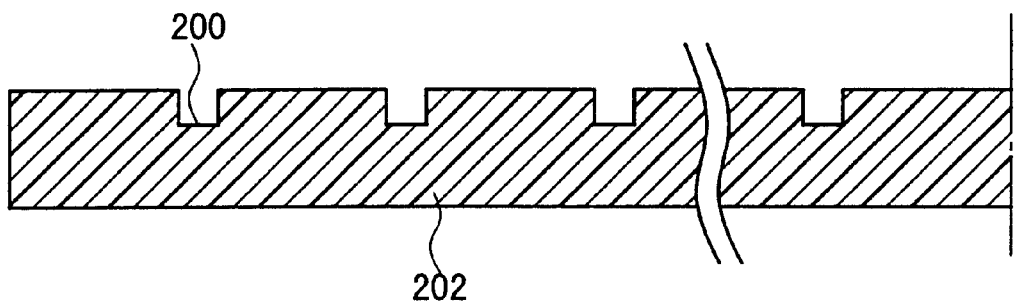
FIG. 15A shows a production step illustrating a state in which a groove is formed on a substrate.

At first, the resin material such as polycarbonate is subjected to injection molding, compression molding, or injection compression molding by using the molding machine 20 of each of the first and second molding equipments 12A, 12B to produce the substrate 202 including the tracking groove or the irregularity (groove) 200 for indicating information such as an address signal, formed on the first principal surface as shown in FIG. 15A.

The material for the substrate 202 includes, for example, polycarbonate, acrylic resin such as polymethyl methacrylate, vinyl chloride-based resin such as polyvinyl chloride and vinyl chloride copolymer, epoxy resin, amorphous polyolefine, and polyester. These materials may be used in combination, if desired. Among the materials described above, it is preferable to use polycarbonate in view of, for example, the moisture resistance, the dimensional stability, and the price. The depth of the groove 200 is preferably within a range of 0.01 to 0.3 μm. The half value width is preferably within a range of 0.2 to 0.9 μm.

The substrate 202, which is taken out of the molding machine 20, is cooled in the cooling section 22 disposed at the downstream stage, and then it is stacked on the stack pole 24 with its first principal surface directed downwardly. At the stage at which a predetermined number of substrates 202 are stacked on the stack pole 24, the stack pole 24 is taken out of the molding equipment 12A, 12B. The stack pole 24 is transported to the subsequent application equipment 14, and it is accommodated in the stack pole-accommodating section 40 of the application equipment 14. The transport may be carried out by using a cart, or it may be carried out by using a self-propelled automatic transport apparatus.

Figure 15B:
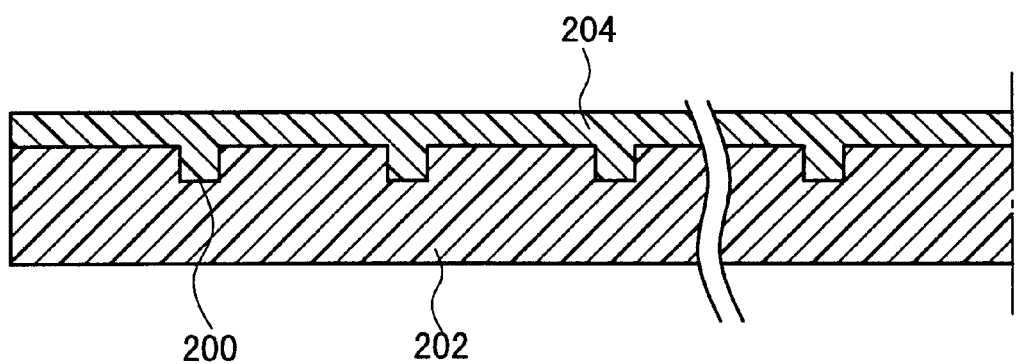
FIG. 15B shows a production step illustrating a state in which a dye recording layer is formed on the substrate.

At the stage at which the stack pole 24 is accommodated in the stack pole-accommodating section 40, the first transport mechanism 42 is operated. The substrate 202 is taken out of the stack pole 24 one by one, and it is transported to the electrostatic blow mechanism 44 disposed at the downstream stage. The static electricity is removed by the electrostatic blow mechanism 44 from the substrate 202 transported to the electrostatic blow mechanism 44. After that, the substrate 202 is transported by the second transport mechanism 46 to the subsequent dye application mechanism 48. The substrate 202 is introduced into any one of the spin coat apparatuses 52 of the six spin coat apparatuses 52. The dye solution is applied onto the first principal surface of the substrate 202 introduced into the spin coat apparatus 52. Subsequently, the substrate 202 is rotated at a high speed to obtain a uniform thickness of the dye solution, followed by being applied with the drying treatment. Accordingly, as shown in FIG. 15B, the dye recording layer 204 is formed on the first principal surface of the substrate 202.

That is, the substrate 202, which is introduced into the spin coat apparatus 52, is installed to the spinner head apparatus 402 shown in FIG. 2, and it is held horizontally by the aid of the fixture 420. Subsequently, the dye solution is supplied from the pressurizing tank, and a predetermined amount of the dye solution is adjusted by the aid of the valve apparatus 408. The dye solution is dripped via the nozzle 406 onto the inner circumferential side of the substrate 202.

As described above, the nozzle 406 has the following surface. That is, the portion, which includes the forward end surface and the outer or inner wall surface or both of the outer and inner wall surfaces ranging over the distance of not less than 1 mm from the forward end surface, is composed of the fluorine compound. Therefore, the adhesion of the dye solution scarcely occurs, and the deposition and the deposit of the dye are scarcely formed, which would be otherwise caused when the dye solution is dried. Therefore, the applied film can be smoothly formed without causing any trouble such as any defect of the applied film.

A dye solution, which is obtained by dissolving the dye in an appropriate solvent, is used as the dye solution. The concentration of the dye in the dye solution is generally within a range of 0.01 to 15% by weight, preferably within a range of 0.1 to 10% by weight, especially preferably within a range of 0.5 to 5% by weight, and most preferably within a range of 0.5 to 3% by weight.

The spinner head apparatus 402 can be rotated at a high speed by the aid of the driving motor. The dye solution, which is dripped onto the substrate 202, is subjected to casting in the direction toward the outer circumference on the surface of the substrate 202 in accordance with the rotation of the spinner head apparatus 402, and it arrives at the outer circumferential edge of the substrate 202 while forming the applied film.

Figure 17:
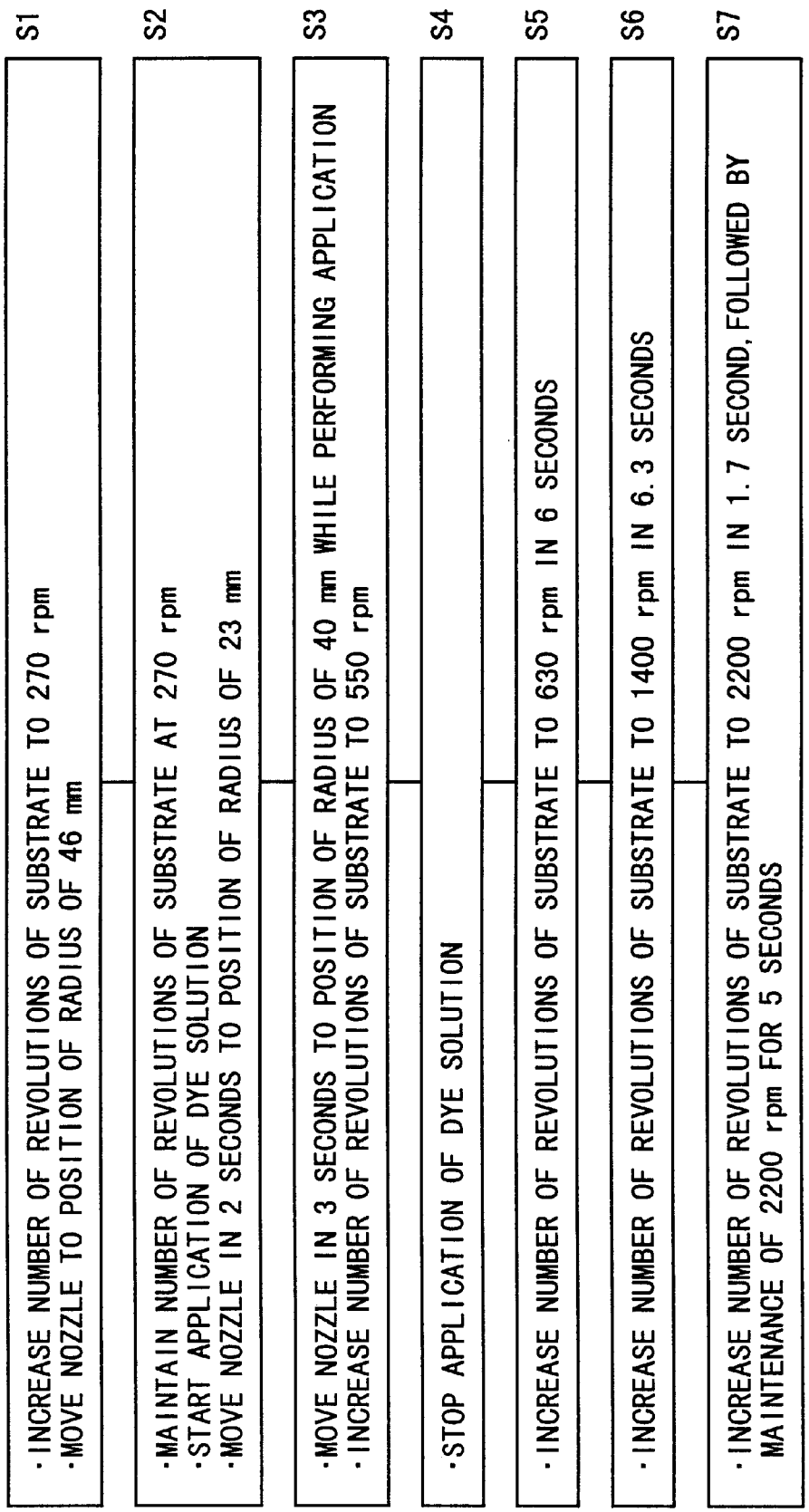
FIG. 17 shows a block diagram illustrating steps of a first process procedure carried out when the dye solution is applied to the substrate by using the production system according to the embodiment of the present invention.

Especially, in the embodiment of the present invention, the dye solution is applied onto the substrate 202 in accordance with the first process procedure as shown in FIG. 17 or the second process procedure as shown in FIG. 18.

At first, the first process procedure will be explained. In the step S1 shown in FIG. 17, the number of revolutions of the substrate 202 is increased up to about 270 rpm, simultaneously with which the support plate 410 (see FIG. 3) of the solution supply apparatus 400 is rotated in the horizontal direction to move the nozzle 406, for example, to a position of radius of 46 mm of the substrate 202.

After that, in the step S2, the number of revolutions of the substrate 202 is maintained at 270 rpm, and the application of the dye solution is started. In this state, the support plate 410 is rotated in the horizontal direction to move the nozzle 406 to a predetermined position Ps (see FIGS. 4 and 20) on the substrate 202 in about 2 seconds.

Figure 20:
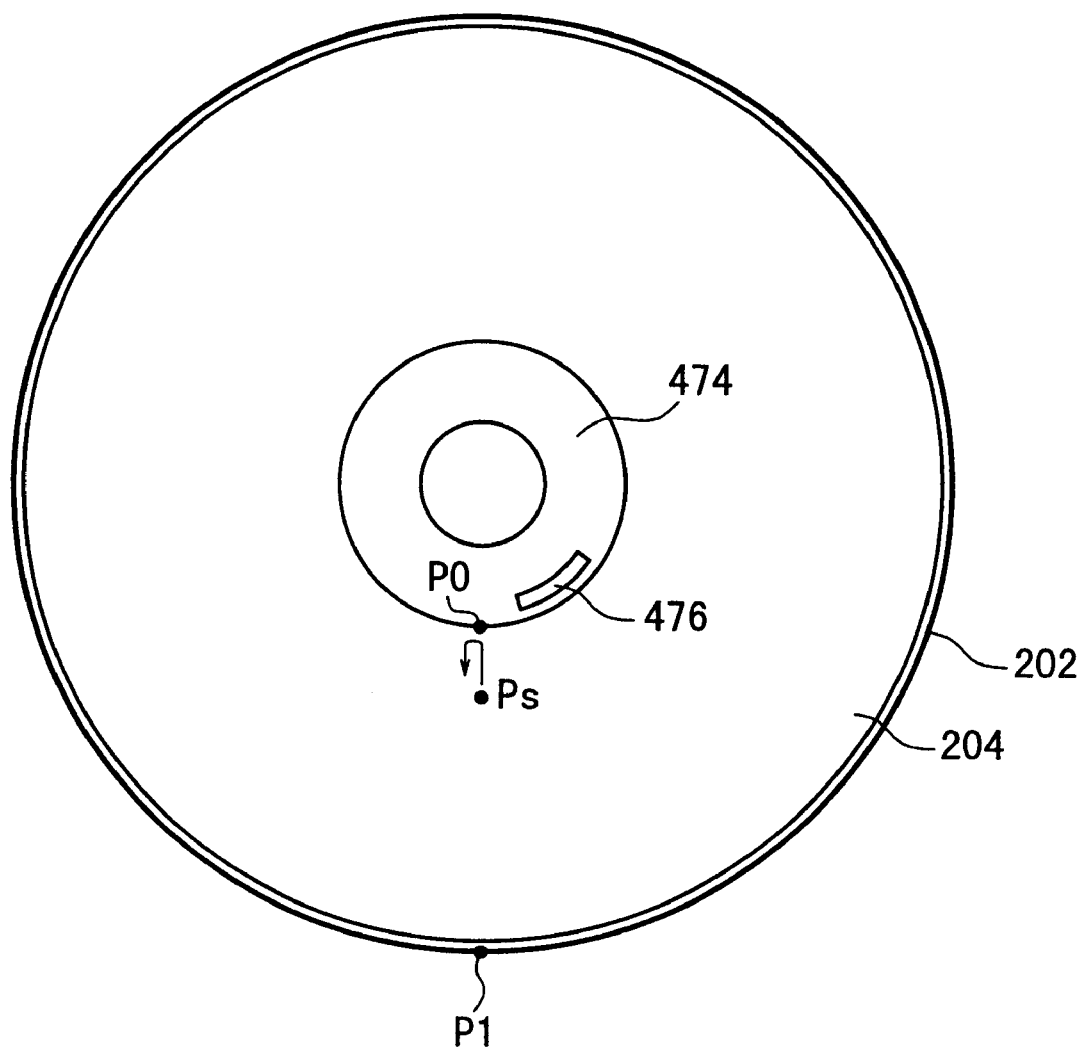
FIG. 20 illustrates an application start position on the substrate.

As shown in FIGS. 4 and 20, the predetermined position Ps is the following position. That is, the position is deviated toward the inner circumference by not less than 5 mm from the outer circumferential end P1 of the substrate 202. The position is deviated toward the outer circumference by not less than 5 mm, preferably not less than 10 mm, and more preferably not less than 15 mm from the portion on the inner circumferential side on the substrate 202 to which the dye solution is not applied, i.e., from the end P0 on the inner circumferential side of the region to be formed as the dye recording layer 204. In this embodiment, the position is located at a radius of 23 mm.

Subsequently, in the step S3, the application of the dye solution is started. The nozzle 410 is moved once toward the inner circumferential side. After that, the dye solution is applied, while the support plate 410 is rotated in the horizontal direction to move the nozzle 406 in about 3 seconds to a position of radius of 40 mm. Simultaneously, the number of revolutions of the substrate 202 is increased to 550 rpm.

After that, in the step S4, the application of the dye solution is stopped. The arm 410 is rotated in the horizontal direction to restore the nozzle 406 to the original position (initial state).

Subsequently, in the step S5, the number of revolutions of the substrate 202 is increased in 6 seconds to 630 rpm.

After that, in the step S6, the number of revolutions of the substrate 202 is increased in 6.3 seconds to 1400 rpm.

Finally, in the step S7, the number of revolutions of the substrate 202 is increased in 1.7 second to 2200 rpm, and then the number of revolutions of the substrate 202 (=2200 rpm) is maintained for 5 seconds.

As the number of revolutions is increased in the step S5 to the step S7, the excessive application solution, which arrives at the outer circumferential edge of the substrate 202, is separated off by the aid of the centrifugal force. The excessive application solution is scattered to the surroundings of the edge of the substrate 202. As shown in FIGS. 2 and 3, the scattered excessive application solution collides with the scattering-preventive wall 404, and it is gathered in the saucer provided thereunder. After that, the excessive application solution is recovered through the drain 424. The applied film is dried during the formation process and after the formation of the applied film. The thickness of the applied film (dye recording layer) is generally within a range of 20 to 500 nm and preferably within a range of 50 to 300 nm.

In the dye application treatment in the steps S1 to S7 described above, the air speed of the clean air fed to the application equipment 14 is set to be not more than about 0.4 m/sec by using the air-conditioning system 300. That is, the air-conditioning air speed with respect to the dye application surface of the substrate 202 is set to be not more than about 0.4 m/sec.

At the stage at which the treatment in the step S7 is completed, the rotation of the substrate 202 is stopped to complete the application treatment of the dye solution onto the substrate 202.

Next, the second process procedure is carried out as follows. At first, in the step S101 shown in FIG. 18, the substrate 202 is rotated at a number of revolutions of not more than 300 rpm, simultaneously with which the arm 410 (see FIG. 3) of the solution supply apparatus 400 is rotated in the horizontal direction to transport the nozzle 406 to a position deviated outwardly from a position of ¾ of the radius from the center of the substrate 202. At the point of time at which the nozzle 406 arrives at the predetermined position Ps, the application of the dye solution is started. In this procedure, the number of revolutions of the substrate 202 is not more than 300 rpm, preferably not more than 250 rpm, and most preferably not more than 200 rpm. The position of the nozzle 406 is located outside a position of ¾ of the radius from the center of the substrate 202, preferably outside a position of ⅚, and most preferably outside a position of 9/10.

In this embodiment, the pressure to apply the dye solution by using the nozzle 406 is not more than 1.0 atm., preferably not more than 0.7 atm., and most preferably not more than 0.5 atm. When the diameter of the nozzle 406 is increased twice, the pressure is preferably ¼ of the numerical value described above. When the diameter of the nozzle 406 is decreased to be ½, the pressure is preferably four times the numerical value described above.

The flow rate to apply the dye solution by using the nozzle 406 is not more than 0.5 cc/second, preferably not more than 0.3 cc/second, and most preferably not more than 0.2 cc/second.

Subsequently, in the step S102, the arm 410 is moved toward the inner circumferential side of the substrate 202 at a predetermined movement speed, for example, at a speed of 30 mm/s, while performing the application of the dye solution.

Subsequently, in the step S103, the number of revolutions of the substrate 202 is increased to be larger than the foregoing number of revolutions of the substrate 202 (number of revolutions at the point of time of the start of application) immediately before the nozzle 406 arrives at the innermost circumference.

In this procedure, the timing for increasing the number of revolutions of the substrate 202 is set as follows as shown by a straight line A in FIG. 19. That is, when the number of revolutions is increased immediately before the nozzle 406 arrives at the innermost circumference. the timing is at a stage at which the nozzle 406 arrives at a position separated by a distance shorter than 20 mm from the innermost circumference of the substrate 202, preferably at a stage at which the nozzle 406 arrives at a position separated by a distance shorter than 10 mm therefrom, and most preferably at a stage at which the nozzle 406 arrives at a position separated by a distance shorter than 5 mm therefrom.

Alternatively, the timing for increasing the number of revolutions of the substrate 202 may be selected as follows. That is, the number of revolutions may be increased proportionally in accordance with the movement of the nozzle 406 toward the innermost circumference of the substrate 202 as shown by a dashed line B in FIG. 19, or the number of revolutions may be increased exponentially as shown by a broken line C in FIG. 19.

The number of revolutions of the substrate 202 is larger than the number of revolutions at the point of time of the start of application by not less than 50 revolutions. The former is larger than the latter preferably by not less than 100 revolutions and most preferably by not less than 200 revolutions.

Subsequently, in the step S104, the arm 410 is stopped for 0.2 second at a stage at which the nozzle 406 arrives at the innermost circumference (for example, at a position of radius of 22 mm).

After that, in the step S105, the arm 410 is moved toward the outer circumferential side of the substrate 202 at a predetermined movement speed, for example, at a speed of 60 mm/s.

Subsequently, in the step S106, the application of the dye solution is stopped at a stage at which the nozzle 406 is separated by a predetermined distance in the radial direction from the innermost circumference. The arm 410 is rotated in the horizontal direction to restore the nozzle 406 to the original position (initial state). In this procedure, the timing to stop the application is at a stage at which the nozzle 406 arrives at a position separated by a distance shorter than 20 mm from the innermost circumference, preferably at a stage at which the nozzle 406 arrives at a position separated by a distance shorter than 10 mm therefrom, and most preferably at a stage at which the nozzle 406 arrives at a position separated by a distance shorter than 5 mm therefrom.

Subsequently, in the step S107, the number of revolutions of the substrate 202 is increased to 630 rpm in 6 seconds.

After that, in the step S108, the number of revolutions of the substrate 202 is increased to 1400 rpm in 6.3 seconds.

Finally, in the step S109, the number of revolutions of the substrate 202 is increased to 2200 rpm In 1.7 second. After that, the number of revolutions of the substrate 202 (=2200 rpm) is maintained for 5 seconds.

As the number of revolutions is increased in the step S107 to the step S109, the excessive application solution, which arrives at the outer circumferential edge of the substrate 202, is separated off by the aid of the centrifugal force. The excessive application solution is scattered to the surroundings of the edge of the substrate 202. As shown in FIGS. 2 and 3, the scattered excessive application solution collides with the scattering-preventive wall 404, and it is gathered in the saucer provided thereunder. After that, the excessive application solution is recovered through the drain 424.

Also in the second process, the air speed of the clean air fed to the application equipment 14 is set to be not more than about 0.4 m/sec by using the air-conditioning system 300. That is, the air-conditioning air speed with respect to the dye application surface of the substrate 202 is set to be not more than about 0.4 m/sec.

At the stage at which the treatment in the step S109 is completed, the rotation of the substrate 202 is stopped to complete the application treatment of the dye solution onto the substrate 202.

It is noted that the first process shown in FIG. 17 may be combined with the second process shown in FIG. 18.

In the present invention, the dye to be used for the dye recording layer 204 is not specifically limited. Those usable as the dye include, for example, cyanine dye, phthalocyanine dye, imidazoquinoxaline dye, pyrylium dye, thiopyrylium dye, azulenium dye, squalirium dye, metal complex dye based on, for example, Ni or Cr, naphthoquinone dye, anthraquinone dye, indophenol dye, indoaniline dye, triphenylmethane dye, merocyanine dye, oxonol dye, aluminum dye, diimmonium dye, and nitroso compound. Among these dyes, it is preferable to use cyanine dye, phthalocyanine dye, azulenium dye, squalirium dye, oxonol dye, and imidazoquinoxaline dye.

The solvent of the application agent for forming the dye recording layer 204 includes, for example, ester such as butyl acetate and cellosolve acetate; ketone such as methyl ethyl ketone, cyclohexanone, and methyl isobutyl ketone; chlorinated hydrocarbon such as dichloromethane, 1,2-dichoroethane, and chloroform; amide such as dimethylformamide; hydrocarbon such as cyclohexane; ether such as tetrahydrofuran, ethyl ether, and dioxane; alcohol such as ethanol, n-propanol, isopropanol, n-butanol, and diacetone alcohol; fluorine solvent such as 2,2,3,3,-tetrafluoro-1-propanol; and glycol ether such as ethylene glycol monomethyl ether, ethylene glycol monoethyl ether, and propylene glycol monomethyl ether.

The solvent may be used singly or in combination of two or more species in an appropriate manner considering the dissolving property of the dye to be used. Preferably, the fluorine solvent such as 2,2,3,3,-tetrafluoro-1-propanol is used. An anti-fading agent and a binder may be added to the application solution, if desired. Further, a variety of additives such as an antioxidant, a UV-absorbing agent, a plasticizer, and a lubricant may be added to the application solution depending on the purpose of the use.

Representative examples of the anti-fading agent include nitroso compound, metal complex, diimmonium salt, and aminium salt. These examples are described, for example, in respective patent documents such as Japanese Laid-Open Patent Publication Nos. 2-300288, 3-224793, and 4-146189.

The binder includes, for example, natural organic high-molecular compound such as gelatin, cellulose derivative, dextran, rosin, and rubber; and synthetic organic high-molecular compound including, for example, hydrocarbon resin such as polyethylene, polypropylene, polystyrene, and polyisobutylene, vinyl resin such as polyvinyl chloride, polyvinyl vinylidene, and polyvinyl chloride-polyvinyl acetate copolymer. acrylic resin such as polymethyl acrylate and polymethyl methacrylate, polyvinyl alcohol, chlorinated polyethylene, epoxy resin, butylal resin, rubber derivative, and initial condensate of thermosetting resin such as phenol-formaldehyde resin.

When the binder is used, the binder is generally used in an amount of not more than 20 parts by weight, preferably not more than 10 parts by weight, and more preferably not more than 5 parts by weight with respect to 100 parts by weight of the dye.

An undercoat layer may be provided on the surface of the substrate 202 on the side on which the dye recording layer 204 is formed, for example, in order to improve the flatness, improve the adhesive force, and avoid the deterioration of quality of the dye recording layer 204.

The material for the undercoat layer includes, for example, high-molecular compound such as polymethyl methacrylate, acrylic acid-methacrylic acid copolymer, styrene-maleic anhydride copolymer, polyvinyl alcohol, N-methylol acrylamide, styrene-vinyltoluene copolymer, chlorosulfonated polyethylene, nitrocellulose, polyvinyl chloride, chlorinated polyolefine, polyester, polyimide, vinyl acetate-vinyl chloride copolymer, ethylene-vinyl acetate copolymer, polyethylene, polypropylene, and polycarbonate; and surface modifier such as silane coupling agent.

The undercoat layer can be formed such that the foregoing substance is dissolved or dispersed in an appropriate solvent to prepare an application solution, and then the application solution is applied to the substrate surface by utilizing an application method such as spin coat, dip coat, and extrusion coat. The layer thickness of the undercoat layer is generally within a range of 0.005 to 20 $\mu$m, and preferably within a range of 0.01 to 10 $\mu$m.

The substrate 202, on which the dye recording layer 204 is formed, is transported by the third transport mechanism 50 to the subsequent back surface-washing mechanism 54 to wash the surface (back surface) on the side opposite to the first principal surface of the substrate 202. After that, the substrate 202 is transported by the fourth transport mechanism 56 to the subsequent numbering mechanism 58. As shown in FIG. 20, the stamping 476 such as a lot number is formed by means of ink-jet on the transparent portion 474 on the inner circumferential side of the first principal surface or the back surface of the substrate 202.

After that, the substrate 202 is transported by the fifth transport mechanism 60 to the subsequent inspecting mechanism 62 to inspect the presence or absence of any defect of the substrate 202 and the film thickness of the dye recording layer 204. The inspection is performed by radiating light onto the back surface of the substrate 202, and effecting image processing for the transmitted state of light by using, for example, a CCD camera. The result of inspection obtained by the inspecting mechanism 62 is sent to the subsequent sorting mechanism 68.

The substrate 202, which has been completed for the inspection process described above, is sorted and transported by the sorting mechanism 68 to the stack pole 64 for normal products or the stack pole 66 for NG on the basis of the inspection result.

At the stage at which a predetermined number of substrates 202 are stacked on the stack pole 64 for normal products, the stack pole 64 for normal products is taken out of the application equipment 14, and it is transported to the subsequent aftertreatment equipment 16. The stack pole 64 is accommodated in the stack pole-accommodating section 80 of the aftertreatment equipment 16. The transport may be carried out by using a cart, or it may be carried out by using a self-propelled automatic transport apparatus.

At the stage at which the stack pole 64 for normal products is accommodated in the stack pole-accommodating section 80, the sixth transport mechanism 82 is operated. The substrate 202 is taken out of the stack pole 64 one by one, and it is transported to the electrostatic blow mechanism 84 disposed at the downstream stage. The static electricity is removed by the first electrostatic blow mechanism 84 from the substrate 202 transported to the first electrostatic blow mechanism 84. After that, the substrate 202 is transported by the seventh transport mechanism 86 to the subsequent sputtering mechanism 88.

Figure 15C:
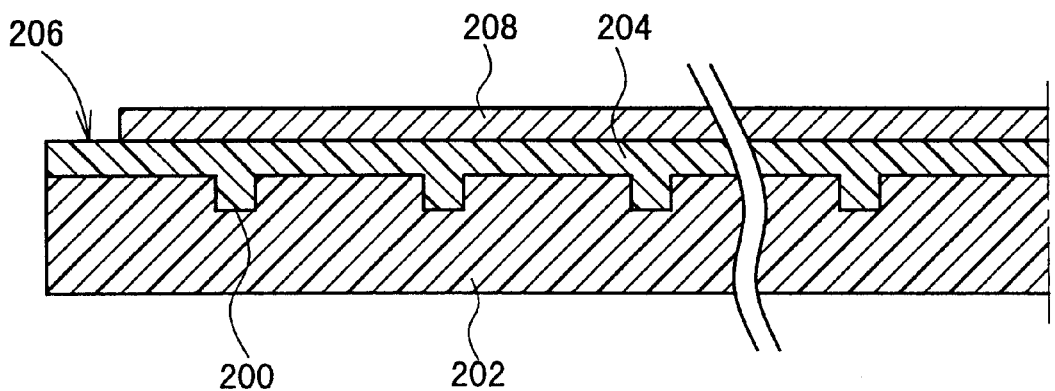
FIG. 15C shows a production step illustrating a state in which a light-reflective layer is formed on the substrate.

As shown in FIG. 15C, the light-reflective layer 208 is formed by sputtering on the entire surface except for the circumferential edge portion (edge portion) of the first principal surface of the substrate 202 introduced into the sputtering mechanism 88.

The light-reflective substance, which is the material for the light-reflective layer 208, is a substance having a high reflectance with respect to the laser beam. The light-reflective substance includes, for example, stainless steel, metalloid, and metal such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, and Bi.

Among them, it is preferable to use Cr, Ni, Pt, Cu, Ag, Au, Al, and stainless steel. The substances may be used singly or in combination of two or more species. Alternatively, the substances may be used as an alloy. It is especially preferable to use Ag or an alloy thereof.

The light-reflective layer 208 can be formed on the recording layer, for example, by performing vapor deposition, sputtering, or ion plating for the light-reflective substance described above. The layer thickness of the reflective layer is generally within a range of 10 to 800 nm, preferably within a range of 20 to 500 nm, and more preferably within a range of 50 to 300 nm.

Figure 16A:
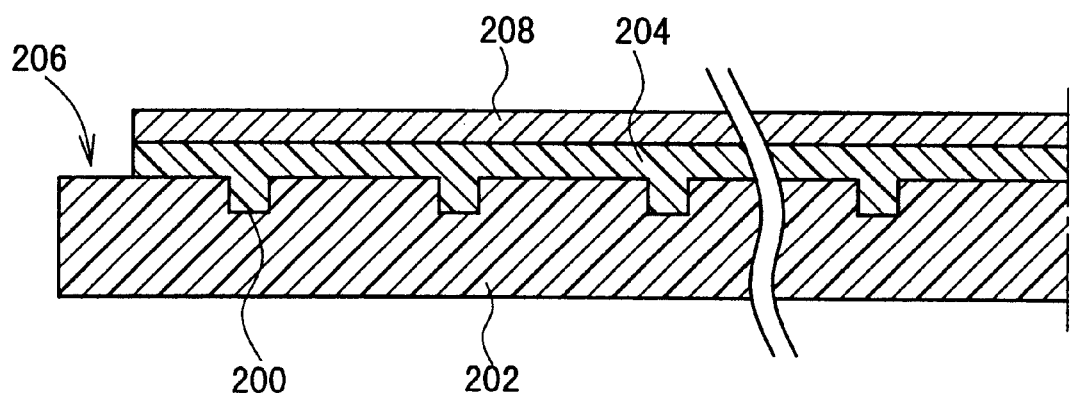
FIG. 16A shows a production step illustrating a state in which an edge portion of the substrate has been washed.

The substrate 202, on which the light-reflective layer 208 is formed, is transported by the eighth transport mechanism 90 to the subsequent edge-washing mechanism 92. As shown in FIG. 16A, the edge portion 206 on the first principal surface of the substrate 202 is washed to remove the dye recording layer 204 having been formed on the edge portion 206. After that, the substrate 202 is transported by the ninth transport mechanism 102 to the subsequent second electrostatic blow mechanism 94 to remove the static electricity.

After that, the substrate 202 is transported by the ninth transport mechanism 102 as well to the UV-curable solution-applying mechanism 96. The UV-curable solution is dripped onto a part of the first principal surface of the substrate 202. After that, the substrate 202 is transported by the ninth transport mechanism 102 as well to the subsequent spin mechanism 98. The substrate 202 is rotated at a high speed. Thus, the applied film thickness of the UV-curable solution dripped onto the substrate 202 is made uniform over the entire surface of the substrate 202.

In this embodiment, the time schedule is managed such that the period of time is not less than 2 seconds and within 5 minutes after the film of the light-reflective layer 208 is formed until the UV-curable solution is applied.

Figure 16B:
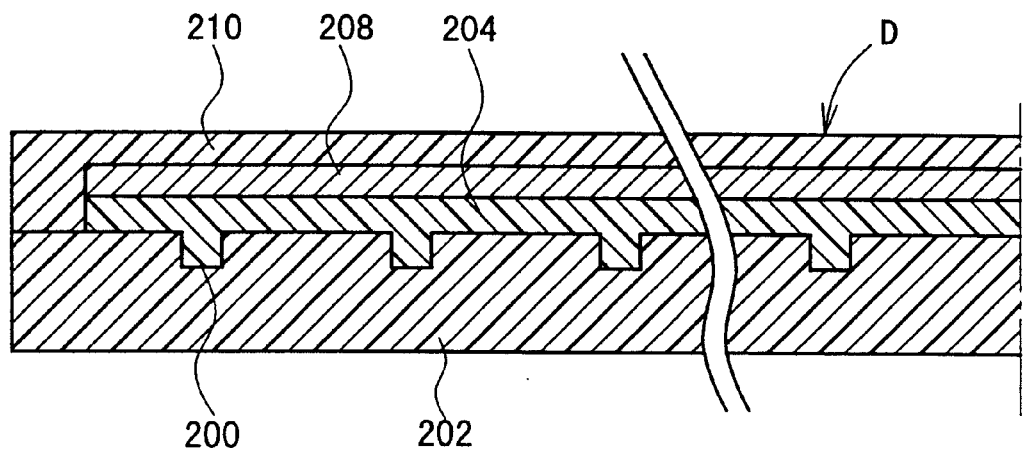
FIG. 16B shows a production step illustrating a state in which a protective layer is formed on the substrate.

After that, the substrate 202 is transported by the ninth transport mechanism 102 as well to the subsequent UV-radiating mechanism 100. The ultraviolet light is radiated onto the UV-curable solution on the substrate 202. Accordingly, as shown in FIG. 16B, the protective layer 210 composed of the UW-curable resin is formed so that the light-reflective layer 208 and the dye recording layer 204 formed on the first principal surface of the substrate 202 are covered therewith. Thus, the optical disk D is constructed.

The protective layer 210 is provided on the light-reflective layer 208 in order that the dye recording layer 204 or the like is protected physically and chemically. The protective layer 210 may be also provided on the side of the substrate 202 on which the dye recording layer 204 is not provided, in order to enhance the scratch resistance and the moisture resistance. The material usable for the protective layer 210 includes, for example, inorganic substance such as SiO, $SiO_2$, $MgF_2$, $SnO_2$, and $Si_2N_4$: and organic substance such as thermoplastic resin, thermosetting resin, and UV-curable resin.

The protective layer 210 can be formed, for example, by laminating a film obtained by extrusion of plastic, onto the light-reflective layer 208 and/or the substrate 202 by the aid of an adhesive. Alternatively, the protective layer 210 may be provided by means of another method such as sputtering and application. When a thermoplastic resin or a thermosetting resin is used, the protective layer 210 can be also formed by dissolving the resin in an appropriate solvent to apply an application solution, and then applying the application solution, followed by being dried.

In the case of the UV-curable resin, the protective layer 210 can be formed as described above by using the resin as it is or dissolving the resin in an appropriate solvent to prepare an application solution, and then applying the application solution, followed by being irradiated with UV light to cure the resin. A variety of additives such as an antistatic agent, an antioxidant, and a UV-absorbing agent may be added to the application solution depending on the purpose of the use. The layer thickness of the protective layer 210 is generally within a range of 0.1 to 100 $\mu$m.

After that, the optical disk D is transported by the tenth transport mechanism 104 to the subsequent defect-inspecting inspecting mechanism 106 and the characteristic-inspecting mechanism 108 to inspect the presence or absence of the defect on the surface of the dye recording layer 204 and the surface of the protective layer 210 and the signal characteristic based on the groove 200 formed on the substrate 202 of the optical disk D. These inspections are performed by radiating light onto the both surfaces of the optical disk D respectively, and effecting image processing for the reflected light by using, for example, a CCD camera. The results of inspection obtained by the defect-inspecting mechanism 106 and the characteristic-inspecting mechanism 108 are sent to the subsequent sorting mechanism 114.

The optical disk D, which has been completed for the defect inspection process and the characteristic inspection process described above, is sorted and transported by the sorting mechanism 114 to the stack pole 110 for normal products or the stack pole 112 for NG on the basis of the respective inspection results.

At the stage at which a predetermined number of optical disks D are stacked on the stack pole 110 for normal products, the stack pole 110 is taken out of the aftertreatment equipment 16, and it is introduced into an unillustrated label-printing step.

As described above, in the production system 10 according to the embodiment of the present invention, when the dye solution for forming the dye recording layer 204 is applied onto the substrate 202 while rotating the substrate 202, the time $\tau$s, which ranges from the point of time t0 at which the application of the dye solution is started to the point of time t1 at which the valve is fully open, is not less than 0.1 second and not more than 1 second so that the opening speed of the valve of the valve apparatus 408 for discharging the dye solution is slow. Therefore, the dye solution is prohibited from sudden discharge from the nozzle 406 at the point of time to of the start of application. The dye solution can be prevented from scattering in all directions at the point of time at which the dye solution falls onto the substrate 202. As a result, it is possible to avoid the occurrence of any defective appearance, and it is possible to improve the yield of the optical disk D.

Especially, in the embodiment of the present invention, the start position Ps of the application of the dye solution (see FIGS. 4 and 20) is located at the position which is separated by not less than 5 mm from the non-applied portion P0 on the inner circumferential side on the substrate 202, i.e., at the position which is deviated toward the outer circumferential side by not less than 5 mm from the end P0 on the inner circumferential side of the region to be formed as the dye recording layer 204.

When the application start position Ps is sufficiently separated from the non-applied portion P0 on the inner circumferential side on the substrate 202, no problem occurs even if the dye solution is scattered, because of the following reason. That is, the scattered droplets flow away during the application treatment performed thereafter.

Immediately after the start of application, the discharge amount of the dye solution is transitionally changed in accordance with the passage of time, and it is not stable. Therefore, it is preferable to start the application at the position which is slightly separated from the innermost circumference, because of the following reason. That is, if the application is started from the innermost circumference, then any uneven application is caused, and it is feared that the inner circumferential end of the dye recording layer 204 does not form a fine circle.

Figure 21:
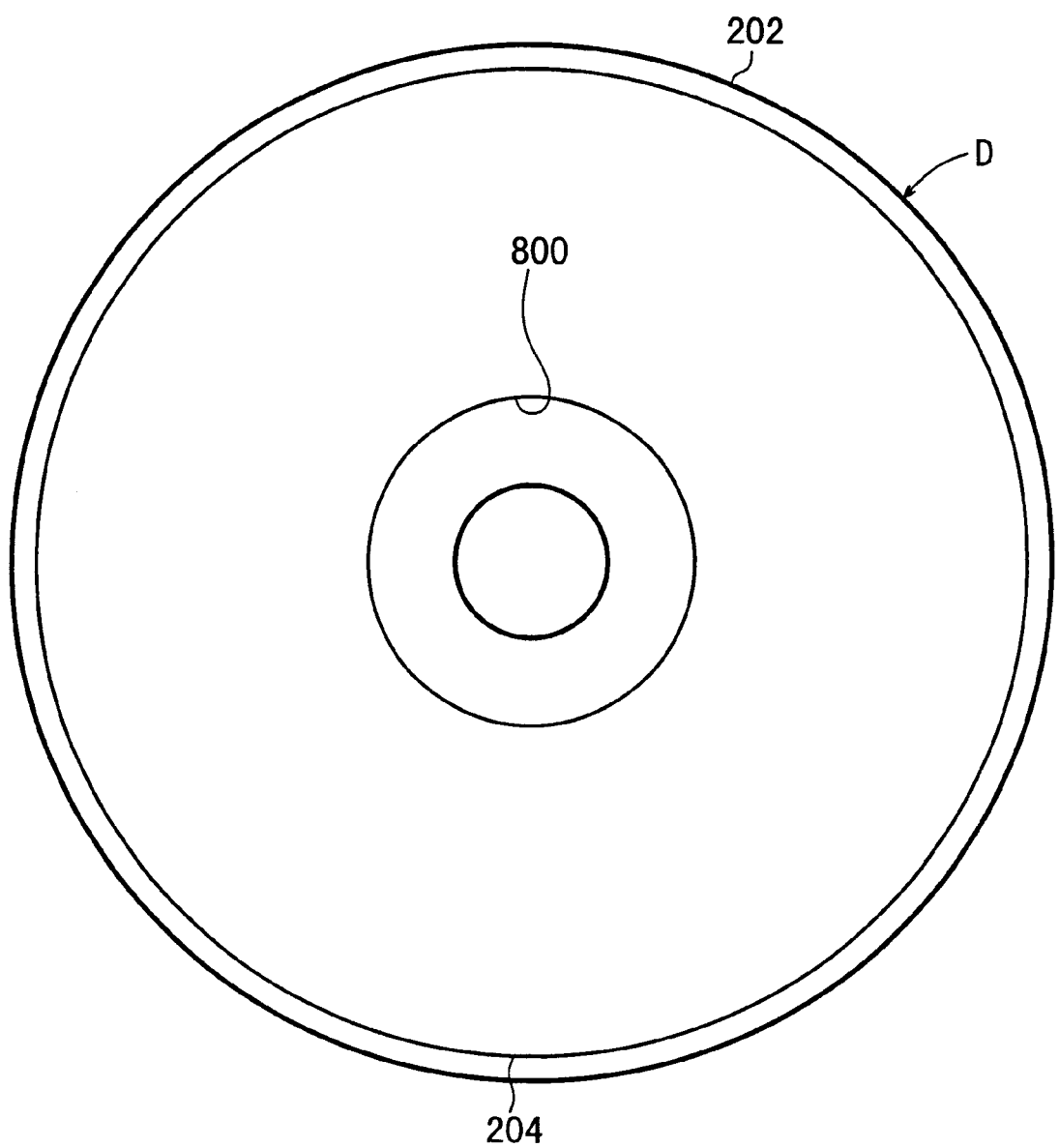
FIG. 21 illustrates the shape of the applied portion located at the innermost circumference when the second process is carried out.

In the embodiment of the present invention, the nozzle 406 is once moved toward the inner circumferential side from the point of time t0 of the start of application of the dye solution. Therefore, as shown in FIG. 21, the inner circumferential end of the dye recording layer 204 forms a fine circle.

If the application is started at the outside of the substrate 202, the dye solution is scattered in various directions when it abuts against the outer circumferential end P1 of the substrate 202. As a result, for example, problems arise in that the neighborhood of the applied portion is stained, and the solution adheres to the back surface of the substrate 202.

Therefore, as in the embodiment of the present invention, the application start position Ps is preferably located on the substrate 202, and more preferably at the position deviated toward the inner circumference by not less than 5 mm from the outer circumferential end P1 of the substrate 202. Further, the application start position Ps is located at the position deviated toward the outer circumference from the non-applied portion P0 on the inner circumferential side on the substrate 202 by not less than 5 mm, preferably not less than 10 mm, and more preferably not less than 15 mm.

On the other hand, the pressure exerted on the dye solution, i.e., the pressure in the pressurizing tank 452 is not more than 1 kgf/cm$^2$ in the embodiment of the present invention. In general, when the dye solution is applied to the substrate 202, the scattering of the dye solution in all directions occurs upon the sudden start of the discharge of the dye solution. On the contrary, when the pressure exerted on the dye solution is small, the problem of defective appearance or the like does not arise, because the dye solution is not scattered to a large extent.

However, if the pressure is too low, then the discharge amount per unit time is decreased, and the application speed is slow. Therefore, it takes a long time to apply a prescribed amount of the dye solution. As a result, it is feared that the throughput is reduced, and the production efficiency is lowered.

Therefore, the preferred range of the pressure exerted on the dye solution is as follows as described above. That is, the upper limit is not more than 1 kgf/cm$^2$, preferably not more than 0.8 kgf/cm$^2$, and most preferably not more than 0.6 kgf/cm$^2$. The lower limit is not less than 0.02 kgf/cm$^2$, preferably not less than 0.05 kgf/cm$^2$, and most preferably not less than 0.1 kgf/cm$^2$.

The optical disk D, which is produced by using the production system 10 according to the embodiment of the present invention, is produced such that the number of revolutions of the substrate 202 at the point of time of the start of application is increased when the dye solution is applied to the inner circumferential side of the substrate 202 in the application treatment with the dye solution.

Concerning this point, in the case of first process shown in FIG. 17, the number of revolutions of the substrate 202 is increased when the nozzle 406 is moved toward the outermost circumference from the innermost circumference of the substrate 202. Therefore, the applied film thickness of the dye solution applied to the substrate 202 is substantially uniform over the entire surface of the substrate 202. Accordingly, it is possible to decrease the dispersion of the level of the push-pull signal in the radial direction. Further, it is possible to allow the signal intensity of the push-pull signal to be within the prescribed range. This results in the realization of high quality of the optical disk D.

In the case of the second process shown in FIG. 18, the number of revolutions of the substrate 202 is increased when the nozzle 406 is moved toward the innermost circumference of the substrate 202. Therefore, as shown in FIG. 21, it is possible to obtain the good shape (substantially perfect circle) of the applied portion 80 on the innermost circumference even when the amount of the dye solution is decreased. Further, it is possible to form the uniform dye recording layer 204 over the entire surface of the substrate 202. Thus, it is possible to produce the high quality optical disk D.

Figure 22:
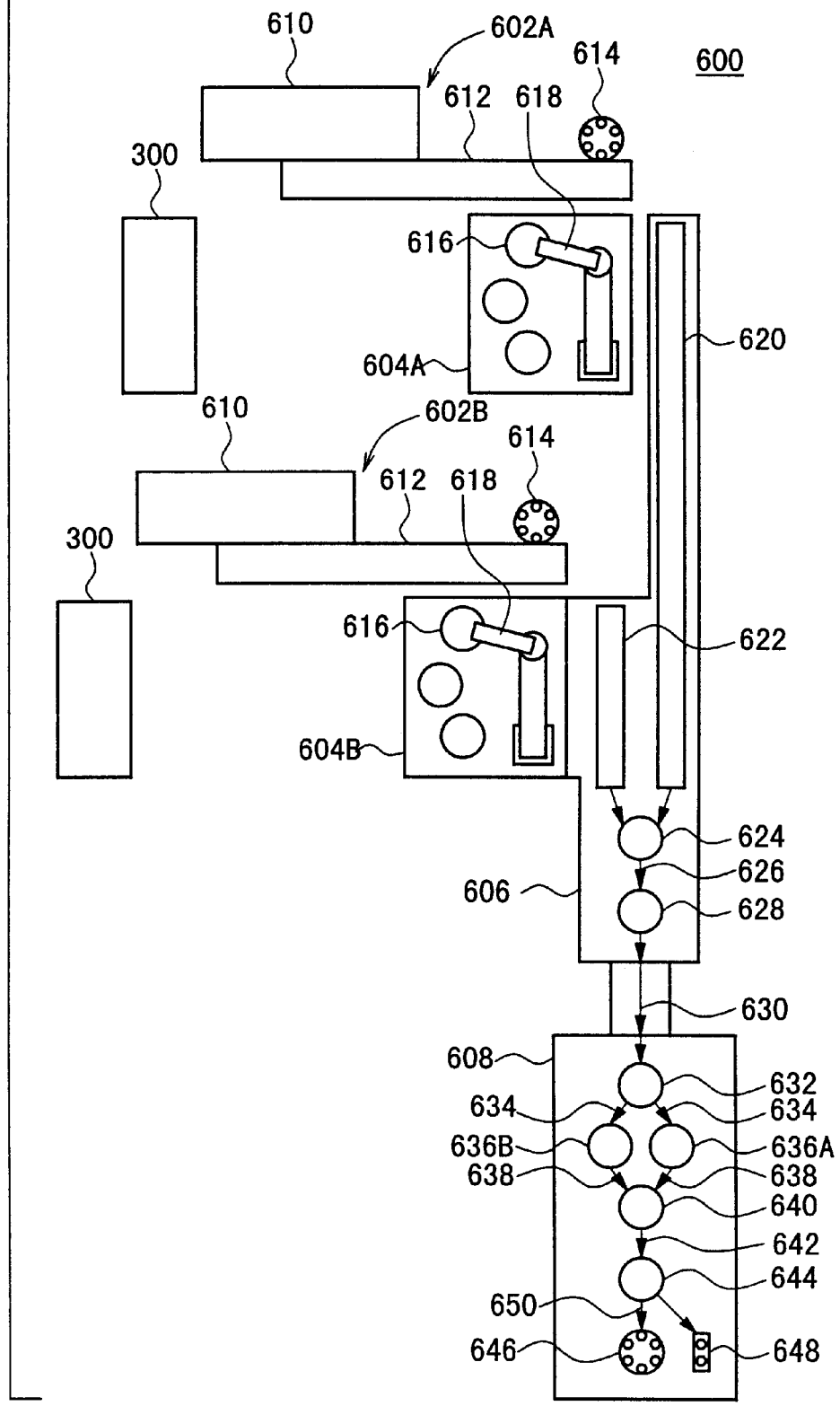
FIG. 22 shows an arrangement illustrating another exemplary production system according to another embodiment of the present invention.

The optical disk D according to the embodiment of the present invention can be also produced by using a production system 600 shown in FIG. 22 in addition to the production system 10 shown in FIG. 1.

The production system 600 shown in FIG. 22 comprises two molding equipments (first and second molding equipments 602A, 602B) for producing substrates 202 by means of, for example, injection molding, compression molding, or injection compression molding, two application equipments (first and second application equipments 604A, 604B) for forming a dye recording layer 204 on the substrate 202 by applying a dye application solution onto a first principal surface of the substrate 202 followed by drying, an inspection equipment 606 for inspecting the dye recording layer 204 formed by the application equipments 604A, 604B, and an aftertreatment equipment 608 for forming a light-reflective layer on the dye recording layer 204 of the substrate 202 by means of, for example, sputtering, and then applying a UV-curable solution onto the light-reflective layer, followed by UV irradiation to form a protective layer on the light-reflective layer.

Each of the first and second molding equipments 602A, 602B includes a molding machine 610 for performing injection molding, compression molding, or injection compression molding of a resin material such as polycarbonate to produce the substrate 202 formed, on the first principal surface, with a tracking groove or irregularity (groove) 200 to indicate information such as an address signal, and a cooling conveyer 612 for cooling the substrate 202 while transporting the substrate 202 taken out of the molding machine 610. Stack poles 614 for stacking and storing the substrates 202 after the cooling treatment are installed at the terminal end of the cooling conveyer 612.

Each of the first and second application equipments 604A, 604B comprises three spin coat apparatuses 616 for applying the dye and washing the edge, and a multi-joint robot 618 for extracting one by one the substrate 202 stacked on the stack pole 614 for the first and second molding equipments 602A, 602B and transporting the substrate 202 to any one of the spin coat apparatuses 616.

The inspection equipment 606 comprises a first transport conveyer 620 for transporting the substrate 202 completed for the treatment in the first application equipment 604A to the next step, a second transport conveyer 622 for transporting the substrate 202 completed for the treatment in the second application equipment 604B to the next step, a numbering mechanism 624 for stamping a lot number or the like on the substrate 202 transported by the first and second transport conveyers 620, 622, a first transport mechanism 626 for transporting, to the next step, the substrate 202 completed for the stamping of the lot number or the like, and an inspecting mechanism 628 for inspecting the presence or absence of defect and the film thickness of the dye recording layer 204 of the substrate 202 transported by the first transport mechanism 626.

The aftertreatment equipment 608 comprises a substrate import mechanism 630 for receiving the substrate 202 completed for the inspection process performed by the inspection mechanism 628, a sputtering mechanism 632 for forming, by means of sputtering, a light-reflective layer on the first principal surface of the substrate 202 imported by the substrate import mechanism 630, a second transport mechanism 634 for successively transporting the substrate 202 completed for the sputtering of the light-reflective layer to the next step, two application spin mechanisms (first and second application spin mechanisms 636A, 636B) for applying a UV-curable solution to the substrate 202 transported by the second transport mechanism 634 and then rotating the substrate 202 at a high speed to obtain a uniform thickness of an applied film of the UV-curable solution on the substrate 202, a third transport mechanism 638 for transporting, to the next step, the substrate 202 completed for the treatment in any one of the first and second application spin mechanisms 636A, 636B, a UV-radiating mechanism 640 for radiating ultraviolet light onto the substrate 202 transported by the third transport mechanism 638 so that the UV-curable solution is cured to form a protective layer on the first principal surface of the substrate 202, a fourth transport mechanism 642 for transporting the UV-irradiated substrate 202 to the next step, a defect-inspecting mechanism 644 for inspecting any defect of the applied surface and the protective layer surface of the substrate 202 transported by the fourth transport mechanism 642. and a sorting mechanism 650 for sorting the substrates 202 into those to be stacked on a stack pole 646 for normal product and those to be stacked on a stack pole 648 for NG depending on a result of inspection performed by the defect-inspecting mechanism 644.

Also in the case of the production system 600, the first process shown in FIG. 17 is carried out when the dye solution is applied to the inner circumferential side of the substrate 202 in the application treatment to apply the dye solution to the substrate 202. Accordingly, the applied film thickness of the dye solution applied to the substrate 202 is substantially uniform over the entire surface of the substrate 202. It is possible to decrease the dispersion of the level of the push-pull signal in the radial direction. Thus, it is possible to realize a high quality of the optical disk D.

The second process shown in FIG. 18 may be also carried out when the dye solution is applied to the substrate 202. Accordingly, the shape of the applied portion 800 on the innermost.circumference can be made excellent (substantially perfectly circular) even when the amount of the dye solution is decreased. Further, it is possible to form the uniform dye recording layer 204 over the entire surface of the substrate 202. Thus, it is possible to produce the high quality optical disk D.

In the production systems 10, 600 described above, the substrate 202 is continuously transported after the film of the light-reflective layer 208 is formed so that the UV-curable solution for forming the protective layer is dripped onto the light-reflective layer 208. Alternatively, the substrates 202 subjected to the film formation of the light-reflective layer 208 may be once accumulated, and the UV-curable solution may be dripped onto the substrate 202, for example, by means of a sheet-feed procedure. In this procedure, the substrate 202 with the formed film of the light-reflective layer 208 may be stacked on a stack pole, and it may be transported, for example, to the subsequent UV-curable solution-applying step. However, it is preferable to use a line in which the step of forming the light-reflective layer 208 is continuous to the step of applying the UV-curable solution.

Next, three illustrative experiments (conveniently referred to as "first to third illustrative experiments") will be explained. At first, the first illustrative experiment relates to samples (Examples 1 to 4 and Comparative Examples 1 to 3) when the optical disk D is produced by using the production system 10 shown in FIG. 1, which is directed to the scattering probability, the time until the application speed is stabilized, and the application ratio when the opening degree of the first speed controller 462 is changed.

With reference to FIG. 20, the scattering probability is determined on the basis of the distribution of droplets adhered to the transparent portion 474 (portion to which no droplet is intended to adhere) on the inner circumferential side on the substrate 202. The scattering probability is 0% when no droplet adheres at all.

As shown in FIG. 5, the time until the application speed is stabilized indicates the time Ts from the point of time t0 at which the application of the dye solution is started to the point of time t1 at which the application speed of the dye solution is constant (point of time at which the valve is fully open). The application ratio resides in the application state of the dye solution on the substrate 202 to be determined by the film thickness inspection for the dye recording layer 204. The application ratio is 100% when the application is completed normally.

The dye recording layer 204 was formed as follows. That is, 2.65 g of a cyanine dye compound represented by the following general formula (1) was combined and blended with 0.265 g of an anti-fading agent represented by the following general formula (2), and they were dissolved in 100 cc of 2,2,3,3,-tetrafluoro-1-propanol represented by the following expression (3) to prepare a dye solution for forming the recording layer.

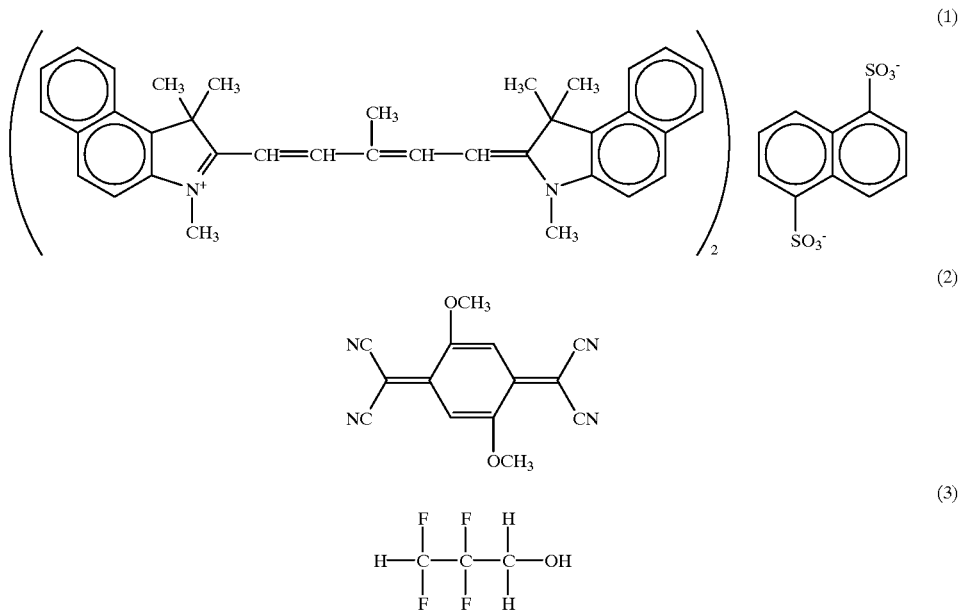

After that, a polycarbonate substrate (diameter: 120 mm, thickness: 1.2 mm) was prepared, in which a spiral-shaped groove (track pitch: 1.6 µm, groove width: 0.4 µm. groove depth: 0.16 µm) was formed on the surface by means of injection molding. The dye solution was applied by means of spin coat onto the surface on the side of the groove of the polycarbonate substrate while changing the number of revolutions from 270 rpm to 2000 rpm to form the dye recording layer 204 (thickness in the groove: about 200 nm). The process for applying the dye solution was carried out in accordance with the steps shown in FIG. 17. The pressure of the pressurizing tank was 0.3 kgf/cm$^2$.

Obtained experimental results are shown in FIG. 23. According to the experimental results, it is understood that the scattering probability is 0%, and there is no appearance defect for Examples 1 to 4 and Comparative Example 1 in which the time τ until stabilization is longer than 0.1 second.

However, as for Comparative Example 1, the opening degree of the first speed controller 462 is 2% which is lower than 5%. Therefore, any non-applied portion appeared due to shortage of the discharge amount of the dye solution. The application ratio was 20%.

Therefore, according to the experimental results, it is understood that the opening degree of the first speed controller 462 is preferably within a range of not less than 5% and not more than 50%, and more preferably not less than 20% and not more than 50%.

Next, the second illustrative experiment relates to Examples 5 to 7 and Comparative Examples 4 and 5 when the optical disk D is produced by using the production system 10 shown in FIG. 1, which is directed to the level of the push-pull signal and the light reflectance at a predetermined position on the optical disk D when the air speed with respect to the applied surface and the application pattern are changed respectively in the process for applying the dye solution to the substrate 202.

The light reflectance (%) indicates the light reflectance obtained when no pit is formed for the groove, i.e., in the non-recorded state. It is prescribed that the light reflectance during reproduction is not less than 65% for the practical optical disk D. Therefore, it is sufficient that the light reflectance is not less than 67% in the non-recorded state.

The push-pull signal was determined as follows. A laser beam was radiated onto completed optical disks D concerning Examples 5 to 7 and Comparative Examples 4 and 5 to observe the amplitude (signal intensity) of the push-pull signal when the tracking was deviated at respective three points (points of radius of 23 mm, 45 mm, and 58 mm). The unit of the amplitude is arbitrary unit.

If the signal intensity of the push-pull signal is less than 0.09, the tracking deviation tends to occur. On the contrary, if the signal intensity of the push-pull signal is not less than 0.14, it is indicated that the light reflectance is too low.

The air speed was 0.1 m/sec in Example 5, 0.2 m/sec in Example 6, 0.4 m/sec in Example 7, 0.6 m/sec in Comparative Example 4, and 0.1 m/sec in Comparative Example 5.

The dye solution was applied in accordance with the following application patterns. That is, the application was carried out in accordance with the first process shown in FIG. 17 for Examples 5 to 7 and Comparative Example 4 (conveniently referred to as "Pattern A"). Example 5 is illustrative of a case in which the number of revolutions of the substrate 202 was 270 rpm in the step S3 shown in FIG. 17, i.e., the application was carried out without changing the number of revolutions of the substrate 202 (conveniently referred to as "Pattern B").

Obtained experimental results are shown in FIG. 24. According to the experimental results, in Examples 5 to 7 in which the application pattern is Pattern A, and the air speed is not more than 0.4 m/sec, the signal intensity of the push-pull signal is within a range of 0.09 to 0.12 at the three points, and the signal intensity is approximately constant at all of the three points. Further, the light reflectance is not less than 68% in the non-recorded state.

On the other hand, in Comparative Example 4, the light reflectance is sufficient. However, the signal intensity of the push-pull signal is not more than 0.09 at the three points. It is understood that any problem occurs in the tracking servo.

In Comparative Example 5, the signal intensity of the push-pull signal is 0.15 at the position of radius of 23 mm, indicating that the light reflectance is insufficient. The measured light reflectance is 66%, which does not satisfies the prescribed value of 67%.

As described above, it is understood that good results are obtained in Examples 5 to 7 for the light reflectance and the signal intensity of the push-pull signal as compared with Comparative Examples 4 and 5.

Next, the third illustrative experiment relates to Example 11 and Comparative Examples 11 to 16 when the optical disk D (radius: 60 mm) is produced by using the production system 10 shown in FIG. 1 to observe the characteristic obtained when the application pattern is changed with respect to the applied surface shown in FIG. 18. Obtained experimental results are shown in FIG. 25.

In Example 11, at first, the substrate 202 was rotated at a number of revolutions of 200 rpm, simultaneously with which the application of the dye solution was started (see the step S101 in FIG. 18) at the stage at which the arm 410 (see FIG. 3) of the solution supply apparatus 400 arrived at a position of 55 mm from the center of the substrate 202. After that, the arm 410 was moved toward the inner circumferential side of the substrate 202 (see the step S102) at a speed of 30 mm/s while performing the application of the dye solution.

In this process, the pressure for applying the dye solution by using the nozzle 406 was not more than 0.5 atm., and the application flow rate of the dye solution by using the nozzle was 0.2 cc/second.

The number of revolutions of the substrate 202 was increased to 400 rpm (see the step S103) at the stage at which the nozzle 406 arrived at a position of 30 mm from the center of the substrate 202. The arm 410 was stopped for 0.2 second (see the step S104) at the stage at which the nozzle 406 arrived at a position of 20 mm from the center of the substrate 202 (innermost circumference).

After that, the arm 410 was moved toward the outer circumferential side of the substrate 202 at a speed of 60 mm/s (see the step S105). The application of the dye solution was stopped (see the step S106) at the stage at which the nozzle 406 arrived at a position of 30 mm from the center of the substrate 202. The arm 410 was rotated in the horizontal direction to restore the nozzle 406 to the original position (initial state).

After that, the number of revolutions of the substrate 202 was increased in 6 seconds to 630 rpm (see the step S107), and the number of revolutions of the substrate 202 was increased in 6.3 seconds to 1400 rpm (see the step S108). Subsequently, the number of revolutions of the substrate 202 was increased in 1.7 second to 2200 rpm. After that, the number of revolutions of the substrate 202 (=2200 rpm) was maintained for 5 seconds (see the step S109). After that, the rotation of the substrate 202 was stopped to complete the treatment for applying the dye solution to the substrate 202. The series of application pattern is defined to be Pattern C.

On the other hand. Comparative Example 11 was carried out in the same manner as Example 11 except that the application of the dye solution was started at a position of 40 mm from the center of the substrate 202 in the step S101. This application pattern is designated as Pattern D. Comparative Example 12 was carried out in the same manner as Example 11 except that the number of revolutions upon the start of application of the dye solution was 350 rpm. This application pattern is designated as Pattern E.

Comparative Example 13 was carried out in the same manner as Example 11 except that the arm 410 was moved toward the inner circumferential side of the substrate 202 at a speed of 60 mm/s while performing the application of the dye solution. This application pattern is designated as Pattern F. Comparative Example 14 was carried out in the same manner as Example 11 except that the number of revolutions of the substrate 202 was 200 rpm even at the stage at which the nozzle 406 arrived at the position of 30 mm from the center of the substrate 202. This application pattern is designated as Pattern G.

Comparative Example 15 was carried out in the same manner as Example 11 except that the arm 410 was not stopped even at the stage at which the nozzle 406 arrived at the innermost circumference. This application pattern is designated as Pattern H. Comparative Example 16 was carried out in the same manner as Example 11 except that the application flow rate of the dye solution was 1 cc/second. This application pattern is designated as Pattern I.

As a result of the experiments, it has been revealed concerning Example 11 that the jitter is 31 ns at the point of 25 mm from the center of the substrate 202, and the film thickness of the dye recording layer 204 scarcely fluctuates, i.e., the dye solution is uniformly applied over the entire surface of the substrate 202.

In Comparative Example 11, the non-applied portion appeared on the outer circumferential portion. In Comparative Examples 12 and 13, when the dye solution was applied to the outer circumference of the substrate 202, then the dye solution rolled and fell like balls, and the non-applied portion appeared.

Figure 26:
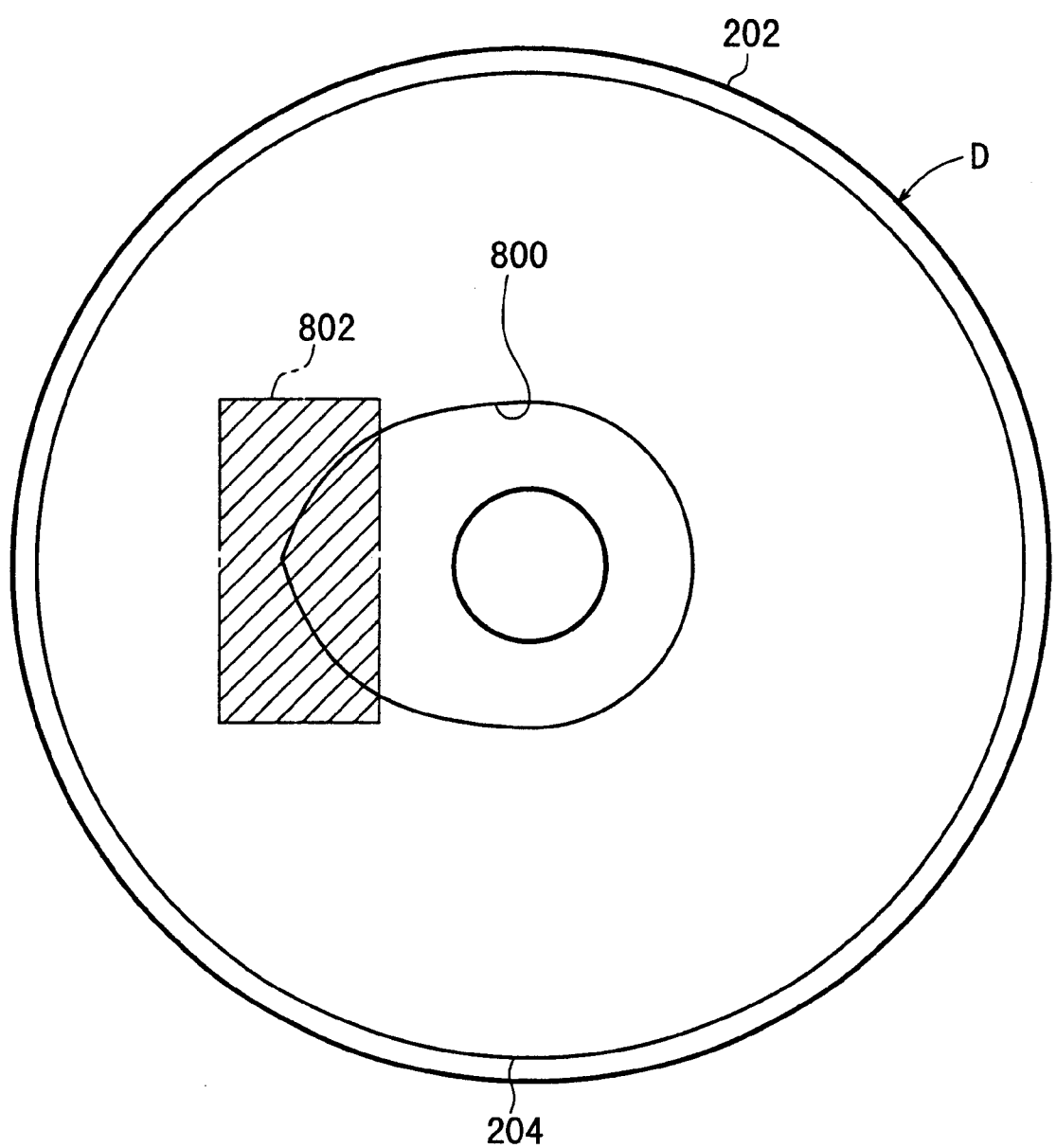
FIG. 26 illustrates the shape of the applied portion located at the innermost circumference as obtained in Comparative Examples 14 and 15.
Figure 27:
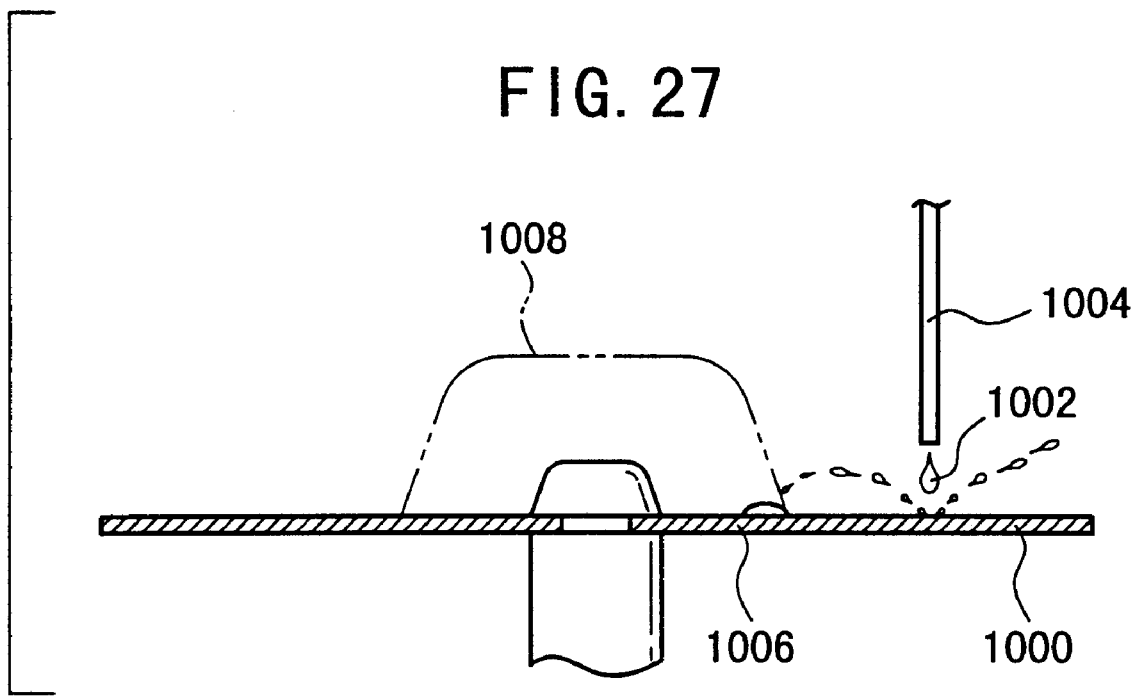
FIG. 27 illustrates the scattering of the dye solution caused when the dye solution is applied.

In Comparative Examples 14 and 15, as shown in FIG. 26, the shape of the applied portion 800 on the innermost circumference was disturbed, and no perfect circle was formed. Especially, the fluctuation of the film thickness on the circumference is large at the point of 25 mm from the center of the substrate 202 (especially in a region 802 indicated by hatched lines in FIG. 26). The jitter was increased to be 41 ns. In Comparative Example 16, the application flow rate was increased, and a problem arose in that the cost was expensive.

As described above, in Example 11, the dye solution can be uniformly applied over the entire surface of the substrate 202, and it is possible to facilitate the reduction of jitter.

It is a matter of course that the method for producing the optical information-recording medium and the optical information-recording medium according to the present invention are not limited to the embodiments described above, which may be embodied in other various forms without deviating from the gist or essential characteristics of the present invention.

What is claimed is:

1. A heat mode type optical information-recording medium comprising, on a substrate, a recording layer capable of recording information by being irradiated with a laser beam, wherein:

said recording layer is formed by applying a solution for forming said recording layer onto said substrate while rotating said substrate; and said recording layer is formed by applying said solution such that a number of revolutions of said substrate is increased when said solution is applied to an inner circumferential side of said substrate.

2. A method for producing a heat mode type optical information-recording medium having, on a substrate, a recording layer capable of recording information by being irradiated with a laser beam, said method comprising the step of:

applying a solution for forming said recording layer onto said substrate while rotating said substrate, wherein:

a perfect time, which ranges from a point of time at which application of said solution is started to a point of time at which an application speed of said solution is constant, is not less than 0.1 second and not more than 1 second.

3. The method for producing said optical information-recording medium according to claim 2, wherein:

a valve apparatus is used for executing and stopping discharge of said solution to said substrate depending on opening and closing of a valve; and an opening speed of said valve is not less than 5% and not more than 50% with respect to a maximum speed.

4. The method for producing said optical information-recording medium according to claim 3, wherein:

said valve is opened and closed by means of a fluid pressure;

a speed controller is used for controlling a flow rate of a fluid to be supplied to said valve apparatus; and an opening degree of said speed controller for determining said flow rate of said fluid is not less than 5% and not more than 50%.

5. The method for producing said optical information-recording medium according to claim 2, wherein said solution is a dye-containing organic solvent.

6. The method for producing said optical information-recording medium according to claim 2, wherein a position to start said application is located on said substrate.

7. The method for producing said optical information-recording medium according to claim 6, wherein said position to start said application is separated by not less than 5 mm from a non-applied portion located on an inner circumferential side of said substrate.

8. The method for producing said optical information-recording medium according to claim 2, wherein a pressure exerted on said solution is not more than 1 kgf/cm$^2$.

9. The method for producing said optical information-recording medium according to claim 2, wherein when a nozzle for applying said solution onto said substrate is moved toward an innermost circumference of said substrate, a number of revolutions of said substrate is increased.

10. The method for producing said optical information-recording medium according to claim 9, wherein said application of said solution is started from an outer circumference of said substrate.

11. The method for producing said optical information-recording medium according to claim 10, wherein said application of said solution is started from a portion located outwardly from a position of ¾ of a radius from a center of said substrate.

12. The method for producing said optical information-recording medium according to claim 10, wherein when said solution is applied to said outer circumference of said substrate, said number of revolutions of said substrate is not more than 300 rpm.

13. The method for producing said optical information-recording medium according to claim 9, wherein said solution is applied by using said nozzle at a pressure of not more than 1.0 atm.

14. The method for producing said optical information-recording medium according to claim 9, wherein said solution is applied by using said nozzle at a flow rate of not more than 0.5 cc/second.

15. The method for producing said optical information-recording medium according to claim 9, wherein when said solution is applied to said innermost circumference of said substrate, said number of revolutions of said substrate is not less than 300 rpm.

16. The method for producing said optical information-recording medium according to claim 9, wherein said number of revolutions of said substrate, which is used when said solution is applied to said innermost circumference of said substrate, is made to be larger by not less than 50 revolutions than said number of revolutions of said substrate which is used when said solution is applied to an outer circumference of said substrate.

17. The method for producing said optical information-recording medium according to claim 16, wherein said number of revolutions of said substrate is increased at a stage at which said nozzle arrives at a position which is separated from said innermost circumference of said substrate by a distance shorter than 20 mm.

18. The method for producing said optical information-recording medium according to claim 9, wherein an air-conditioning air speed with respect to an application surface of said substrate is set to be not more than about 0.4 m/sec.

* * * * *